(12) United States Patent
McGibney

(10) Patent No.: US 7,324,559 B2
(45) Date of Patent: Jan. 29, 2008

(54) CENTRALIZED SYNCHRONIZATION FOR WIRELESS NETWORKS

(76) Inventor: Grant H. McGibney, 4904 Vanguard Road N.W., Calgary, Alberta (CA) T3A 0R7

( * ) Notice: Subject to any disclaimer, the term of this patent is extended or adjusted under 35 U.S.C. 154(b) by 1190 days.

(21) Appl. No.: 09/886,885

(22) Filed: Jun. 21, 2001

(65) Prior Publication Data

US 2002/0181438 A1    Dec. 5, 2002

(30) Foreign Application Priority Data

May 16, 2001    (CA) .................................... 2347927

(51) Int. Cl.
  *H04J 3/06* (2006.01)
  *H04B 7/14* (2006.01)
  *H04Q 7/20* (2006.01)

(52) U.S. Cl. ............... 370/509; 370/315; 370/503; 455/462; 455/517

(58) Field of Classification Search ........ 370/315–350, 370/503–509, 514–516, 536; 375/133–150, 375/229–347, 356, 354, 371–376; 455/188, 455/259–428, 462, 517–524, 130, 132, 255; 709/223, 236; 327/261–294
See application file for complete search history.

(56) References Cited

U.S. PATENT DOCUMENTS 3,611,134 A    10/1971  McDowell ................. 324/187
3,979,749 A    9/1976  Ross et al. ................. 343/13 R (Continued)

FOREIGN PATENT DOCUMENTS

EP    0 961 448 A2    12/1999

OTHER PUBLICATIONS

J.G. Proakis, *Digital Communications*, Third Edition, McGraw-Hill, New York, New York, 1995, pp. 362-365.

(Continued)

*Primary Examiner*—M. U. Phan
(74) *Attorney, Agent, or Firm*—Law Office of Marc D. Machtinger, Ltd.

(57) ABSTRACT

This invention synchronizes the sample clocks of an entire wireless network from a single central base station. Unlike a conventional digital radio network where every terminal must have a synchronization circuit in its receiver to adjust the sample clock, each of the radio terminals in this network is clocked from an independent free-running oscillator. For each terminal, the base station learns the frequency and phase of the oscillator by exchanging a special set of signals: first a vernier signal to determine the initial time and frequency offset, and then an early-late signal to track changes in the oscillator. Once the base station is synchronized to the terminal's oscillator, it can determine the absolute path delay between itself and the terminal and correct for the delay using an equalizer. Signals received from the terminal are corrected after the signal arrives at the base station. Signals sent to the terminal are corrected within the base station before they are transmitted so they arrive at the terminal at the precise time that the terminal's free running oscillator takes a sample.

17 Claims, 13 Drawing Sheets

U.S. PATENT DOCUMENTS

| | | | | |
|---|---|---|---|---|
| 4,518,256 | A | | 5/1985 | Schwartz ........................ 356/5 |
| 4,908,784 | A | | 3/1990 | Box et al. .................... 364/569 |
| 5,142,689 | A | * | 8/1992 | Eisenack .................... 710/107 |
| 5,199,008 | A | | 3/1993 | Lockhart et al. ............ 368/117 |
| 5,280,195 | A | * | 1/1994 | Goto et al. ................. 327/294 |
| 5,483,201 | A | * | 1/1996 | Bortolini .................... 331/1 A |
| 5,552,878 | A | | 9/1996 | Dillard ..................... 356/5.07 |
| 5,561,686 | A | | 10/1996 | Kobayashi et al. ......... 375/200 |
| 5,684,421 | A | * | 11/1997 | Chapman et al. ........... 327/261 |
| 5,844,951 | A | | 12/1998 | Proakis et al. .............. 375/347 |
| 5,875,179 | A | * | 2/1999 | Tikalsky .................... 370/315 |
| 5,933,454 | A | | 8/1999 | Cioffi ........................ 375/260 |
| 5,952,949 | A | * | 9/1999 | Coy et al. ................... 341/144 |
| 5,960,331 | A | | 9/1999 | Weir et al. ..................... 455/75 |
| 5,995,844 | A | * | 11/1999 | Fukuda ....................... 455/462 |
| 6,028,868 | A | | 2/2000 | Yeung et al. ............... 370/515 |
| 6,112,100 | A | * | 8/2000 | Ossoinig et al. ............ 455/502 |
| 6,163,549 | A | * | 12/2000 | Bortolini et al. ............ 370/503 |
| 6,208,871 | B1 | | 3/2001 | Hall et al. .................. 455/517 |
| 6,212,397 | B1 | * | 4/2001 | Langston et al. ........... 455/500 |
| 6,229,367 | B1 | | 5/2001 | Choudhury ................. 327/276 |
| 6,243,841 | B1 | * | 6/2001 | Mydill ........................ 714/724 |
| 6,308,077 | B1 | * | 10/2001 | Walsh ........................ 455/503 |
| 6,373,303 | B2 | * | 4/2002 | Akita .......................... 327/156 |
| 6,711,411 | B1 | * | 3/2004 | Ruffini ........................ 455/502 |

OTHER PUBLICATIONS

P.P. Vaidyanathan, *Multirate Systems and Filter Banks*, Prentice Hall, Englewood Cliffs, New Jersey, 1993, pp. 105-109, 119-120, 133.

L.B. Jackson, *Digital Filters and Signal Processing*, Second Edition, Kluwer, Boston, Massachusetts, 1989, pp. 234-240.

Grant Howard McGibney, *Wireless Networking with Simple Terminals*, a thesis submitted to the faculty of graduate studies in partial fulfillment of the requirements for the degree of doctor of philosophy, Department of Electrical and Computer Engineering, The University of Calgary, Calgary, Alberta, May, 2000, published May 17, 2001.

A photocopy of Canadian Patent Application No. 2,234,777, filed Apr. 15, 1998 (published Oct. 15, 1999), including drawings and filing certificate, 43 pages.

A photocopy of U.S. Appl. No. 09/060,759, filed Apr. 15, 1998, including drawings and filing certificate, 42 pages.

G.H. McGibney and S.T. Nichols, *Asymmetric Orthogonal Frequency Division Multiplexing*, TR Labs, Calgary, Canada, published at the Wireless 2000 Conference Jul. 10, 2000, in Calgary, Alberta, Canada.

* cited by examiner

CENTRALIZED SYNCHRONIZATION FOR WIRELESS NETWORKS

BACKGROUND OF THE INVENTION

A wireless LAN must provide a fast and reliable radio link between a base station and its terminals. A terminal in a wireless LAN is usually a portable device and therefore it is desirable to reduce the hardware requirements of the terminal as much as possible to make it inexpensive, small, and power efficient. The base station is part of the network infrastructure and usually has access to a reliable power supply so the hardware constraints on the base station are not as rigorous. Previous work (Asymmetric Equalization System for Data Transmission, Canadian patent application no. 2,234,777 published Oct. 15, 1999) has shown that radio equalization hardware can be implemented entirely in the base station, eliminating the need to put this complex and expensive hardware in every terminal. This is called an asymmetric design, because as much of the hardware as possible is moved to one side of the communication link. An asymmetric synchronization method is disclosed in this patent, which eliminates the need to put a complex synchronization circuit in every terminal of the network.

Conventional synchronization schemes will not work in an asymmetric network such as this because they always synchronize to the received signal. Suppose that a terminal has no synchronization circuit, just a free-running oscillator to control when it sends and receives information. This terminal sends information to a base station, which then recovers the timing of the signal by one of a number of conventional synchronization techniques. To send information back to the terminal, the base station must time its transmission so that the information passes through the radio channel and arrives at the terminal at the point in time when the free-running oscillator samples. The base station cannot do this because it is missing a key piece of information: the time delay between the terminal and the base station. Because it has synchronized to the received signal, it has no information about the time that the signal was transmitted and therefore cannot formulate an accurate estimate of the delay.

In order to make a synchronization system work asymmetrically, the base station must synchronize to the free-running oscillator of the terminal and not to the received signal. Once synchronized to the terminal's oscillator the base station knows the exact point in time when the terminal's transmission begins. It can then analyze the received signal to determine the absolute delay through the radio channel. Now that the base station knows the time when the terminal's free-running oscillator will sample the signal and the delay in the radio channel, it can time its transmission so that the signal arrives at the terminal already synchronized.

Knowledge of the absolute delay to the terminals may be useful to other components of the network as well since it can be directly translated into a distance measurement. A distance measurement might trigger a handoff algorithm to another network. Several distance measurements from different base stations could be used to triangulate the terminal's location.

SUMMARY OF THE INVENTION

The base station and each terminal in the wireless network contains an oscillator that tells that device when to send and receive information. These oscillators are not perfect and will be offset in time as well as frequency. The purpose of the synchronization circuit is to measure and correct these imperfections so that the information sent from one device is received at the other device at the proper time. The first part of the synchronization process is to measure the parameters required for synchronization such as time offset, frequency offset, and delay. The second part of the process is to use these parameters to adjust the signals to achieve synchronization.

Two things complicate this process. First, delay in a wireless channel is not a simple parameter due to the fact that the signal may take more that one path from the transmitter to the receiver, each with a different delay. This is known as "multipath" and it causes the signal to have a "delay spread" that is usually represented by an impulse response measurement. The other complication is that this network is designed to be asymmetric which means that the terminals themselves have little or no signal processing capabilities and cannot do complex analysis of the signals that they receive. Therefore, all of the signals that are sent from the base station must be designed with the terminal's very limited capabilities in mind.

The synchronization parameters are measured by an exchange of signals between each terminal and the base station. The first signal, called the "training sequence", is sent from the terminal to the base station and is designed to measure the impulse response of the radio channel. Since at this point the base station is not synchronized to the terminal, it cannot determine the absolute delay in each path of the channel, but can determine the relative delays between paths. This is sufficient to establish communications from the terminal to the base station and it allows the base station to construct another signal called the "vernier signal", which is transmitted back to the terminal. The terminal interprets this signal and reports the results back to the base station, and from this the base station can determine the time offset to the terminal's clock, and from that the absolute delay in the radio channel. A second exchange of training sequence and vernier signal some time later tells the base station how fast that the time offset is changing, from this it can calculate the frequency offset between the two clocks. Once these parameters are found using the above method a stream of "early-late" pulses are included with the normal data transmission in order to keep the parameters up to date.

The second part of the synchronization process, correcting the signal, requires the use of an equalizer. The purpose of the equalizer is to undo the distortion effects of the radio channel. If properly configured, the equalizer will remove both the absolute delay and the delay spread of the radio channel for both signals going to and coming from the terminal. Therefore, sampling will occur at the correct time as if the radio channel did not exist. However, this condition only occurs when the base station and terminal oscillators are perfectly synchronized. An offset between the two oscillators will cause the information to be sampled at the wrong time. The synchronizer overcomes this problem by adjusting the equalizer coefficients to overcome the known offset between the oscillators, thus restoring the signals to their correct timing.

There is therefore provided in accordance with an aspect of the invention, a method of synchronizing a base station with a remote terminal, in which the base station has a base oscillator, the base oscillator having a base sample period, and in which the remote terminal has a remote oscillator, the remote oscillator having a remote sample period, the method comprising the steps of:

transmitting a training sequence from the remote terminal to the base station over a channel;

upon receipt of the training sequence at the base station, transmitting a first vernier signal from the base station to the remote terminal over the channel, in which the first vernier signal comprises successive time segments, each time segment being offset in time from a multiple of the remote sample period by different multiples of a fraction of the remote sample period;

identifying a time segment in the successive time segments that upon receipt by the remote terminal most closely matches the remote oscillator;

determining a first time offset between the base oscillator and the remote oscillator from the identified time segment; and advancing signals transmitted from the base station to the remote terminal by the first time offset.

In accordance with a further aspect of the invention, there is provided a base station for synchronizing a telecommunications network, the telecommunications network incorporating a remote terminal having a remote oscillator and the remote oscillator having a remote sample period. The apparatus may comprise a transmitter comprising a digital to analog converter and a pre-equalizer filter, a receiver comprising an analog to digital converter, a base oscillator, the base oscillator having a base sample period, the base oscillator being connected to supply a clock signal to the digital to analog converter and to the analog to digital converter, a frame counter connected to receive a clock signal from the base oscillator, an equalization controller connected to the pre-equalizer filter to provide a timing advance to signals transmitted from the base station, a synchronization controller connected to receive frame position information from the frame counter, the synchronization controller being connected to receive signals from the receiver and being configured to determine a timing advance required to adjust the base oscillator to be synchronized to the remote oscillator, the synchronization controller being connected to supply the timing advance to the equalization controller; and the synchronization controller being configured to generate a vernier signal, in which the vernier signal comprises successive time segments, each time segment being offset in time from a multiple of the remote sample period by different multiples of a fraction of the remote sample, the time segments uniformly covering the sample period.

The transmitted signals may be pre-equalized and/or post-equalized to adjust for channel effects. The offset determining process may also be repeated to determine for frequency drift, and may be updated by an early-late process. Preferably, each succeeding time segment of the successive time segments is offset by successive multiples of a fraction of the remote sample period. More preferably, each succeeding time segment of the successive time segments is advanced by successive multiples of a fraction of the remote sample period. The fraction may have the form 1/N where N is an integer, and preferably uniformly cover the sample period.

In a further aspect of the invention, there is provided apparatus for synchronizing a base oscillator to a remote oscillator, the apparatus comprising, a transmitter, a vernier signal generator connected to supply a vernier signal to the transmitter, a receiver, and a synchronization circuit connected to the receiver and the transmitter for receiving timing information from the remote oscillator and adjusting a timing advance of signals transmitted through the transmitter.

In a futher aspect of the invention, there is provided a terminal, comprising a transmitter, a training signal generator connected to supply a training signal to the transmitter for transmission, a receiver, a terminal oscillator and a signal detection circuit connected to the transmitter, the terminal oscillator and the receiver for receiving a vernier signal from a base station and reporting to the base station which portion of the vernier signal most closely matches the timing of the terminal oscillator.

BRIEF DESCRIPTION OF THE DRAWINGS

There will now be described preferred embodiments of the invention, with reference to the drawings by way of illustration, without intending to limit the generality of the claims, in which:

DETAILED DESCRIPTION OF THE PREFERRED EMBODIMENTS

In the claims, the use of the word "comprising" does not exclude other elements being present. The indefinite article "a" used in the claims does not exclude another one or more of that element being present.

Figure 1:
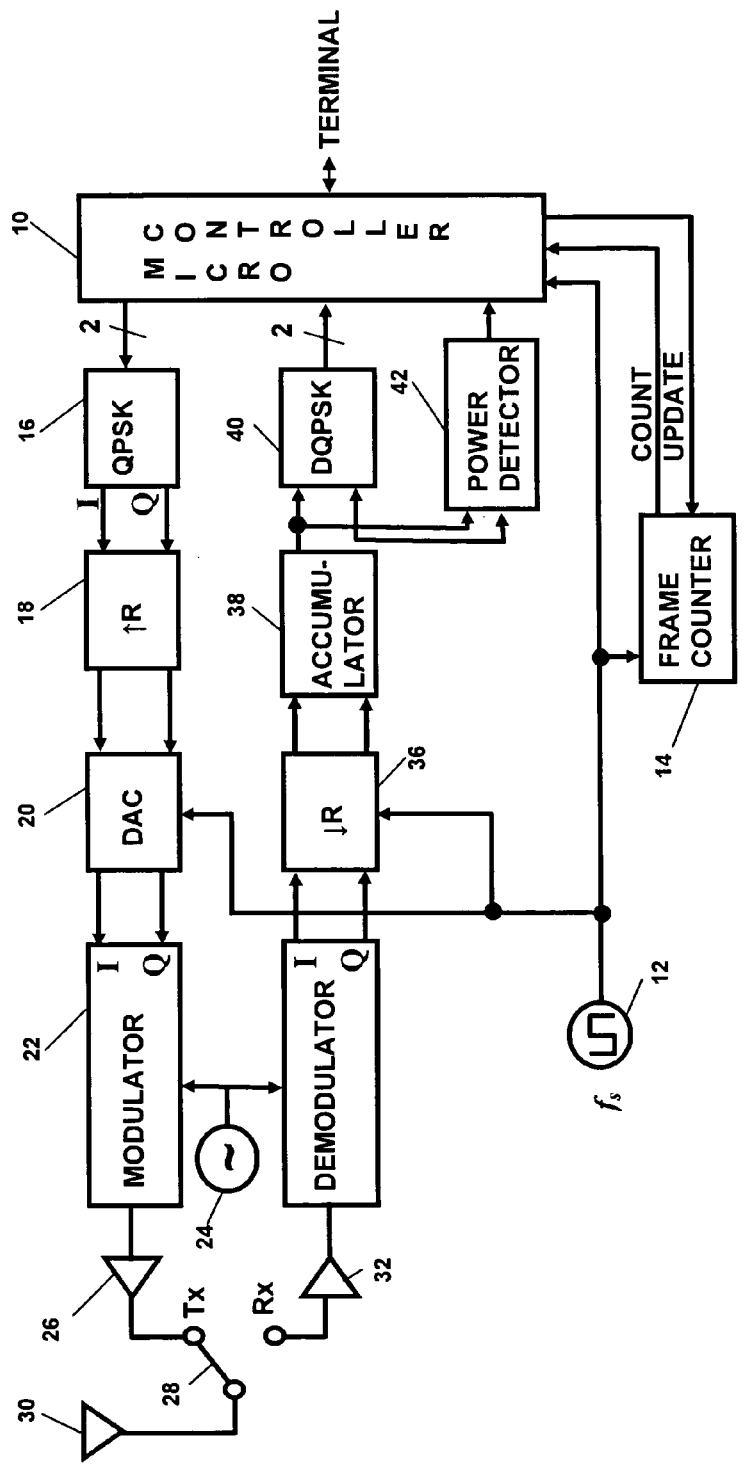
FIG. 1 is a schematic of the terminal hardware.

FIG. 1 shows the structure of one of the terminals in the network. Central to the terminal is a microcontroller 10, which handles all of the data, interfaces the data to the terminal, and all of the network and hardware protocols—including synchronization. A free-running oscillator 12 runs at the maximum symbol rate for the network ($f_s$) and establishes when all events happen within the terminal. A typical symbol rate for this type of a terminal would be 100 MHz. Attached to the oscillator is a frame counter 14. Network time is divided into frames and events within the frame occur at a fixed number of clock cycles after the start of the frame. The frame counter simply counts the number of clock cycles of the oscillator 12 until the end of the frame is reached and then resets itself to zero for the start of the next frame. For example, if the terminal is expecting data at sample 1056, then the microcontroller waits until the frame counter 14 reaches that count, then recovers the data.

The terminal's transmitter consists of an encoder 16, which converts data from the microcontroller into QPSK symbols that are represented by an inphase component (I) and a quadrature component (Q). Following the encoder is an expander (↑R) 18, which takes the symbols from the encoder and inserts zeros between the symbols so that the sample rate at the output of the expander is R times the sample rate at the input. This signal is passed to a dual output digital-to-analog converter (DAC) 20, which converts the digital I and Q signals into analog signals at sample times established by the oscillator 12. These signals are upconverted to radio frequencies using an I/Q modulator 22 and a radio frequency oscillator 24. The result is amplified with a power amplifier 26 and transmitted via a duplex switch 28 though the antenna 30.

To receive signals, the microcontroller 10 switches the duplex switch 28 to the RX position and the signal from the antenna 30 is transferred to low-noise amplifier 32. This is passed to the I/Q demodulator 34 where it is downconverted to baseband inphase and quadrature signals. The decimator (↓R) 36 samples these signals at the sample times established by the oscillator 12. The decimator only passes every Rth sample to its output, thereby reducing sample rate at its output to $f_s/R$. At times it is necessary to add a number of samples together and this is handled by the accumulator 38. The microcontroller 10 controls how many samples are accumulated and setting this value to unity disables the accumulator. The output of the accumlator is passed to a decoder 40, which translates the DQPSK symbols into digital data, and a power detector 42, which measures the combined power level of the inphase and quadrature components.

Figure 2:
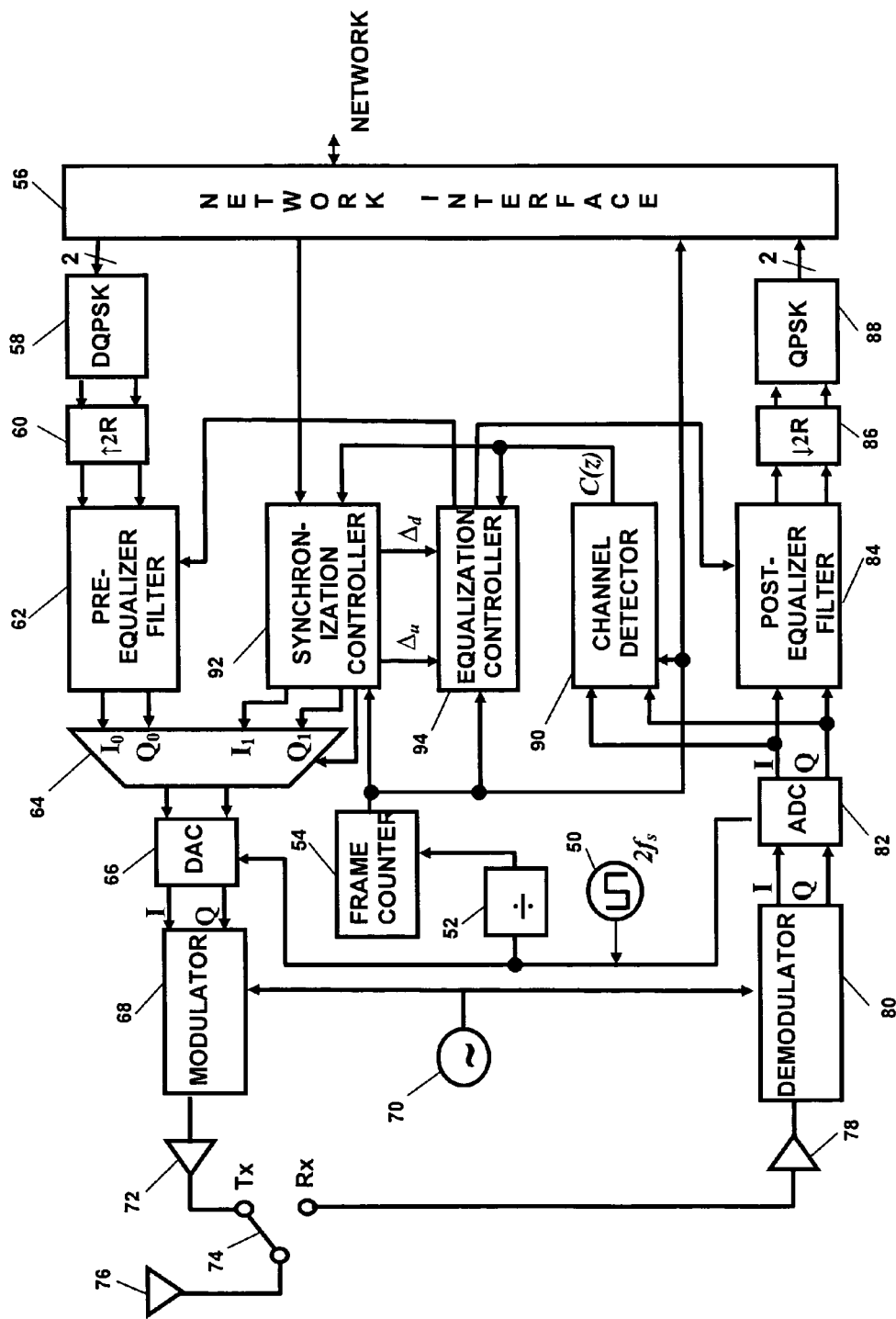
FIG. 2 is a schematic of the base station hardware.

This terminal design has limitations. If the signal arriving at the terminal is distorted in any way, the terminal will not be able to decode it since there is no signal processing in the receiver chain that can correct distortion. Also the sample clock 12 is not adjustable, therefore a signal arriving at the terminal at the wrong time will not be decoded properly. Making sure that these conditions are met is the task of the base station shown in FIG. 2.

Like the terminal, the timing of events in the base station are controlled by a free running oscillator 50. However, the signal processing in the base station requires that the signals be sampled at twice the maximum symbol rate therefore the frequency of this oscillator ($2f_s$) is exactly twice that of the terminal's oscillator 12. A frequency divider 52 cuts this frequency in half to produce a clock signal identical to the terminal's clock. The base station frame counter 54 is identical to the frame counter found in the terminal 14. When the base station and terminal are in perfect synchronization, the two frame counters will always read exactly the same value and change at exactly the same time. However, since the two oscillators 12 and 50 are not perfect, this will seldom be the case. The time offset between an event occurring in the base station frame counter 54 and the terminal frame counter 14 is defined as Δ. The offset is measured in base station clock cycles, and a positive Δ indicates that the base station lags behind the terminal. It is the synchronizer's function to measure Δ for each terminal in its network and use the base station's signal processing to correct the offsets.

The base station is connected to a larger network via a network interface 56. Data destined for a terminal first passes through a DQPSK encoder 58 and then an expander 60. The expander is identical to its counterpart in the terminal 18 except that its expansion factor is twice R to raise the sample rate to twice the maximum symbol rate as required by the signal processing. The pre-equalizer filter 62 is a digital finite impulse response (FIR) filter. The complex coefficients of this filter are computed so that the signals from the base station arrive at the terminal undistorted and at the correct time, as the terminal requires. The output is funneled though a multiplexer 64 to a dual output digital-to-analog converter 66. The remainder of the transmitter chain including modulator 68, RF oscillator 70, power amplifier 72, duplex switch 74, and antenna 76 have the same function as the corresponding components in the terminal (22, 24, 26, 28, and 30 respectively).

Signals received from the terminals are passed through a low-noise amplifier 78 before being demodulated to baseband inphase and quadrature signals by the demodulator 80. These are digitized by a dual input analog-to-digital converter (ADC) 82. The post-equalizer 84 is a FIR filter whose complex coefficients are selected to correct channel dispersion and timing errors of the signals coming from the terminals. The decimator 86 reduces the sample rate by only passing one out of every 2R samples from the equalizer. The QPSK decoder 88 takes these remaining samples and converts them into digital data to be sent out onto the larger network by the network controller 56. Elements 78, 80, 82, 84, 86 and 88 form part of the receiver chain.

Three devices are used to calculate the filter parameters for the pre-equalizer 62 and post-equalizer 84. The channel detector 90 is used to compute an accurate model of the radio channel between the base station and each terminal, with a transfer function denoted C(z). The synchronization controller 92 computes the timing offset Δ between the base station and each terminal. Finally, the equalization controller 94 computes the filter coefficients required to correct both the effects of the channel distortion C(z) and the timing offset Δ. All of these devices may be implemented in a special purpose computer or general purpose computer configured as described in this patent description.

This configuration of a pre-equalizer in the transmitter and a post-equalizer in the receiver is called asymmetric equalization. The advantage of this is that all of the signal processing is in one side of the communication link, the base station, and the other side, the terminal, remains very simple. The synchronization system described in this patent relies on the functioning of an effective asymmetric equalizer. The aspects of asymmetrical equalization relating to synchronization are described below. For a complete description of the function of the equalizer, refer to (Asymmetric Equalization System for Data Transmission, Canadian patent application no. 2,234,777 published Oct. 15, 1999. However, other equalization techniques may be used and this invention is not limited to any particular form of equalization. In addition, in some circumstances channel equalization may not be required.

The equalization filters 62 and 84 are composed of a number of components. Common to both filters is a basic equalizer filter whose transfer function is given by E(z). This is derived from the channel model C(z) with the assumption that there are no synchronization errors. The post-equalization filter 84 is a combination of the basic equalizer E(z) and a timing adjustment filter $T_u(z)$, which is designed to correct any timing offset. Its transfer function is given by $$E_u(z)=E(z)T_u(z). \qquad 1$$

The pre-equalization filter 62 is a combination of the basic equalizer E(z), a timing adjustment filter $T_d(z)$, and a correction factor $(1+z^{-1})$ used to compensate for the different sample rates between the terminal's DAC 20 and the base station's DAC 66. Its transfer function is given by $$E_d(z)=E(z)T_d(z)(1+z^{-1}). \qquad 2$$

Figure 3A:
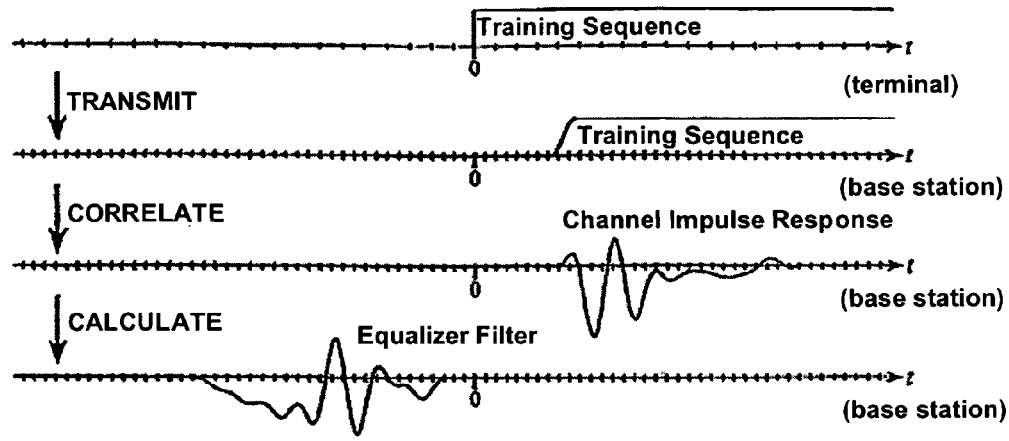
FIGS. 3A, 3B and 3C are graphical illustrations of the function of the equalizers when no timing offset is present.
Figure 3B:
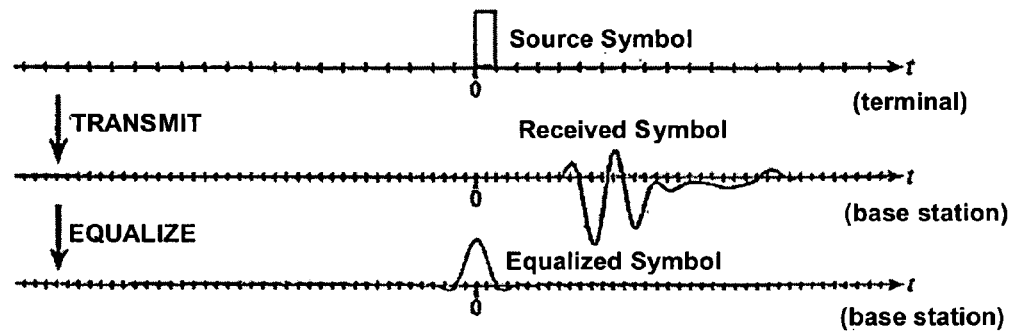
Figure 3C:
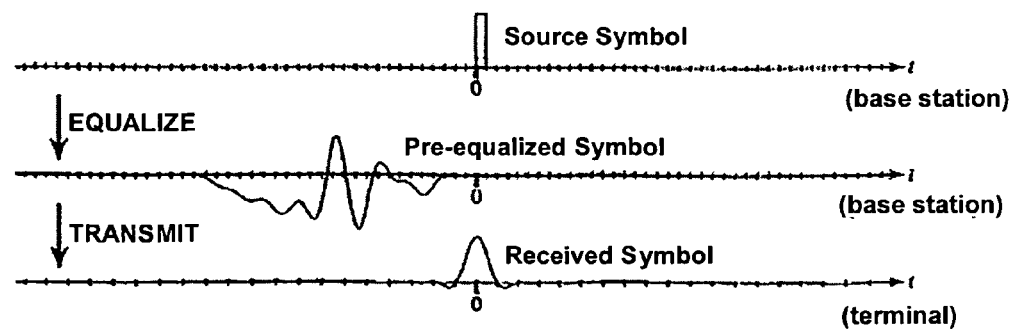

To illustrate the function of the equalizer, assume that the base station and terminal oscillators and frame counters are in perfect synchronization ($\Delta=0$). FIGS. 3a, 3b and 3c shows the three steps of a network packet: training (3a), uplink (3b), and downlink (3c). The horizontal scales are marked with the sample points of the sample clocks. The base station's sample clock runs at twice the sample rate of the terminal's sample clock. The three steps occur at fixed times within the network frame and the events are triggered when the frame counters reach a specific value in both the terminal and the base station. The bold mark on each scale indicates the "zero sample", which is a reference sample for the start of each step. Since the base station clock is in perfect synchronization with the terminal, the zero samples in this example line up exactly.

During the training step, FIG. 3a, the terminal's microcontroller 10 transmits a series of QPSK symbols (described later) that make up the "training sequence". That signal is delayed in arriving at the base station, due to the distance between the two devices, and dispersed by the radio channel. The base station samples the training sequence and computes a channel impulse response model with a transfer function C(z).

The channel detector 90 must accurately measure all of the distortion caused by the radio channel between the terminal and the base station. The channel is defined to include everything from the input of the digital-to-analog converter in the terminal 20 to the output of the analog-to-digital converter in the base station 82, plus the anti-aliasing filter $H_a(z)$ shown in FIG. 9A. This channel is modeled using a discrete finite impulse response (FIR) filter with complex coefficients: C(z). Movement of the terminal or movement within the channel will cause the channel C(z) to change with time. However, for very short time periods, less than a millisecond in the indoor environment, this movement will be insignificant and the channel will appear stationary. Therefore, when a channel measurement is made, it can only be considered valid for a very short period and then the process must be repeated.

The channel from the base station back to the terminal does not have to be directly measured because the same series of components is used to modulate and demodulate the signals and the radio carrier frequency is the same, therefore the distortion will be the same. This keeps the terminal hardware simple since no channel detector hardware need be included in the terminal. The only difference is in the impulse response of the terminal's DAC 20 and the base station's DAC 66 (which operates at twice the sample rate). This difference is corrected by the $(1+z^{-1})$ factor in the downlink equalizer (Equation 2).

To measure the channel, the terminal disables the expander 18 by setting R to unity and then sends a series of QPSK symbols that make up the training sequence. The sequence t(n) is composed of twelve repetitions of the length 16 Frank-Heimiller code $$t(n)=\{1, 1, 1, 1, j, -1, -j, 1, -1, 1, -1, 1, -j, -1, j\} \quad A1$$

This code is chosen because it has a perfect circular autocorrelation property:

$$\sum_{l=0}^{15} t(l)t^*((l+n)\bmod 16) = \begin{cases} 16 & n=0 \\ 0 & n=1 \ldots 15. \end{cases} \quad A2$$

The channel detector 90 records the result of this transmission from the terminal. It then passes the signal through the structure shown in FIG. 9A with a zero value of $\Delta_q$ in order to include the effects of the anti-aliasing filter in the channel measurement. The first and last cycles of the sequence are removed to eliminate edge effects and the remaining ten cycles are averaged to create a low noise, single cycle, length 32 training signal, $t_r(n)$. The received sequence is twice as long as the transmitted sequence since the sample rate is twice as high. The original training sequence (equation A1) is expanded to a length of 32 to match the length of the received signal by inserting zeros between samples. This sequence, $t_e(n)$, is then circularly correlated to the received signals to retrieve estimates of the channel impulse response:

$$c(n) = \sum_{l=0}^{31} t_r(l)t_e^*((l+n)\bmod 32), \quad n=0 \ldots 31. \quad A3$$

Due to this code's good autocorrelation property (Equation A2) the results of Equation A3 will be an accurate representation of the impulse response of the channel (contaminated only by channel noise). The only condition imposed is that the channel's impulse response must not be longer than the length of the code. If this happens, the tail of the impulse response will wrap around to the start during the circular correlation and distort the measurement.

The channel filter C(z) is defined as the z-transform of the impulse response of the channel $$C(z) = \sum_{n=0}^{31} c(n)z^{-n}, k=0 \ldots N. \quad A4$$

and this is passed on to the other modules for equalization and synchronization purposes.

In the state of perfect synchronization, the base stations starts sampling the training sequence at the exact point in time that the terminal sends the signal, therefore all of the delays represented in the impulse response are the actual delays through the channel. From this channel model, the basic equalization filter E(z) is derived.

The function of the equalizer is to remove the distortion caused by the radio channel so that when a signal is sampled at the receiver, the output appears the same as the original transmitted signal with the addition of some random noise. While this synchronization apparatus may work with several types of equalization structures, the one used in this embodiment is the single antenna version of the equalizer described in Canadian patent application no. 2,234,777. The derivation below computes a basic equalization filter E(z) from a channel estimate C(z). The basic equalization filter is included as part of both the pre-equalization filter 62 and the post equalization filter 84. In order to derive the base equalization filter, it is assumed that the sample clock in the terminal 12 is exactly synchronized to the sample clock in the base station 50.

Under the condition of perfect synchronization ($\Delta=0$) the transfer function of the system H(z) as measured between the output of the terminal's encoder 16 and the input of the base station's decoder 88 is $$H(z)=[C(z)E(z)]_{\downarrow 2R} \quad B1$$

where the notation $[\cdot]_{\downarrow M}$ indicates that the impulse response of the transfer function within the brackets is decimated by a factor of M. Ideally, the equalizer takes an estimate of the channel transfer function C(z) and calculates an equalizer function E(z) that forces the transfer function H(z) to unity. There is no unique solution to Equation B1, however, so a simplifying assumption must be made. The equalizer filter E(z) is split into two components as follows:

$$E(z)=A(z^{2R})\tilde{C}(z).\quad \text{B2}$$

The filter $\tilde{C}(z)$ is called the "matched filter" and has an impulse response equal to the time-reversed and conjugated impulse response of the channel model C(z). Mathematically, the matched filter is given by $$\tilde{C}(z)=C^*(1/z^*)\quad \text{B3}$$

The filter $A(z^{2R})$ is called the "common equalizer". Substituting Equation B2 into B1 and setting H(z) to the desired value of unity gives $$[A(z^{2R})C(z)\tilde{C}(z)]_{\downarrow 2R}=1.\quad \text{B4}$$

Because the z exponent of $A(z^{2R})$ is the same as the decimation factor, the noble identity as discussed in P. P. Vaidyanathan, *Multirate Systems and Filter Banks*, Prentice Hall, Englewood Cliffs, N.J., 1993, pp. 119–120 can be applied to move the common equalizer out of the brackets $$A(z)[C(z)\tilde{C}(z)]_{\downarrow 2R}=1.\quad \text{B5}$$

A new transfer function called the "equivalent channel" is defined as $$G_R(z)=[C(z)\tilde{C}(z)]_{2R}\quad \text{B6}$$

and is applied to Equation B5 to give $$A(z)G_R(z)=1.\quad \text{B7}$$

Starting with channel C(z), the equalization controller can calculate $\tilde{C}(z)$ from Equation B3, then $G_R(z)$ from Equation B6, then A(z) from Equation B7, and then finally E(z) from Equation B2. There is a problem however when trying to evaluate Equation B7. In general, $G_R(z)$ is a non-causal finite impulse response (FIR) filter. While it is strictly not possible to implement non-causal filters, there are methods to transform non-causal FIR filters into something that can be implemented (described later). If the filter transfer function is inverted to solve Equation B7, the common equalizer A(z) becomes a non-causal infinite impulse response (IIR) filter. There is no known way to transform A(z) into a filter than can be practically implemented.

To overcome this problem, a new filter $\hat{A}(z)$ is defined as a non-causal FIR filter with a frequency response that approximates the unrealizable IIR filter so that $$\hat{A}(z)G_R(z)\approx 1.\quad \text{B8}$$

The coefficients of $\hat{A}(z)$ may be calculated using the frequency-sampling technique as described by L. B. Jackson, "Digital Filters and Signal Processing", Second Edition, Kluwer, Boston, Mass., 1989, pp. 234–240 or similar techniques. Starting with the channel model C(z), the filter $G_R(z)$ is calculated from Equation B6. The frequency response of G(z) is then calculated at N evenly spaced points around the unit circle by applying the discrete Fourier transform to its impulse response $$G_k = \sum_{n=0}^{N-1} g_R(n)W_N^{kn} \quad k=0\ldots N-1.\quad \text{B9}$$

From this, the frequency response of $\hat{A}(z)$ is determined $$\hat{A}_k=G_k^{-1}\quad \text{B10}$$

then the impulse response is calculated using the inverse DFT $$\hat{a}(n)=\frac{1}{N}\sum_{k=0}^{N-1}\hat{A}_k W_N^{-kn} \quad n=0\ldots N-1.\quad \text{B11}$$

These are the coefficients of the filter $\hat{A}(z)$. The time-loop property of the DFT introduces some error with this method. Since the impulse response of A(z) is infinite, it wraps around in a loop N samples long when the inverse DFT is calculated and distorts the impulse response of $\hat{A}(z)$. To minimize the error, the value of N is chosen so that the time-loop is long enough that the impulse response of A(z) decays to insignificance by the time it wraps around. A typical value of N would be 128 samples.

The equalization controller must also compute the value of R. As the value of R increases, the effectiveness of the equalization filters also increases, and the pre- and post-equalizers are able to handle tougher radio channels more reliably. The penalty for increasing R is that the data rate of the system goes down. As R increases, the symbol rate coming from the terminal's encoder 16 must be decreased proportionally so that the samples coming out of the expander 18 feed the DAC 20 at a constant rate defined by the oscillator 12. Therefore, the equalization controller should find the minimum value of R that allows the equalizers to work effectively at the maximum possible data rate.

The equalizer tends to fail when the frequency response of the equivalent channel is inverted (Equation B10) at a point where the magnitude of $G_k$ is small. This causes a large spike in the gain of the common equalizer at one frequency, which is impractical to implement. To avoid this condition, a threshold T is defined as a fraction of the root-mean-square (rms) gain in the equivalent channel. Whenever any part of the equivalent channel's frequency response drops below that value, R is doubled and the equivalent channel is recalculated. A typical value of T would be 0.3.

To summarize the steps in computing the equalization filter E(z), starting from the channel estimate filter C(z):
1) Compute the matched filter $\tilde{C}(z)$ from Equation B3.
2) Assume R=1 and calculate $G_R(z)$ from Equation B6.
3) Using Equation B9 (normally implemented with the fast Fourier transform algorithm) evaluate the frequency response of the equivalent channel around N points of the unit circle.
4) Calculate the rms gain of the frequency response and determine if any part of the frequency response falls below that gain multiplied by the threshold T. If the gain falls below the threshold, double R, recalculate $G_R(z)$, recalculate the frequency response, and repeat this step.
5) Compute the frequency response of the common equalizer filter from Equation B10.
6) Apply the inverse discrete Fourier transform (normally implemented using the fast Fourier transform algorithm) to the result of Step 5 (Equation B11) to recover the coefficients of the common equalizer $\hat{A}(z)$.
7) Compute the equalization filter from Equation B2.

In general, the equalization filters produced using this method are not causal and therefore can not be implemented directly. However, there is a well-known technique for correcting this problem. A fixed delay is added to the filter in order to make it causal and then the effect of this delay is corrected in some other part of the system. In the case of the post-equalizer 84, the decoder 88 would sample the symbols that same fixed delay later. In the case of the pre-equalizer, the encoder 58 would send the symbols that fixed delay earlier.

The second step of the network packet is the transmission of data from the terminal's microcontroller 10 to the base station's network interface 56. The progression of the signal is shown in FIG. 3*b*. Only the first symbol sent on the zero sample is depicted. After the signal is transmitted through the radio channel, the symbol is delayed and dispersed in time. From there, the symbol passes through the post-equalization filter 84 where the dispersed signal is reconstructed. The equalization filter is designed to force the sampled transfer function of the entire system to unity. A unity transfer function has no delay (i.e. no z terms with non-zero exponents), therefore the equalizer has the effect of removing all delays through the channel and gathering the energy at the same point in time that it was sent. No further synchronization is necessary to recover the symbols.

On the downlink, the equalizer also has the effect of removing all delays, although the process is reversed. FIG. 3*c* shows the steps. Before being transmitted, the symbol passes through the pre-equalization filter 62 that advances and disperses the signal to compensate for the delays in the channel. The channel undoes the distortion introduced by the pre-equalization filters and concentrates the energy at one point in time. Since the transfer function of the system is forced to unity, the symbols arrive at the terminal on the same sample as the original symbol. Again, no further synchronization is necessary.

The example above demonstrates that synchronization is achieved for both the uplink and the downlink when the base station and the terminal are perfectly synchronized. The equalization filter automatically compensates for both the channel dispersion and the channel delay so that signals sent from the base station will arrive at the terminal exactly when they are needed. The next example examines the effects on the signals when the base station and terminal clocks are not in perfect synchronization.

Figure 4A:
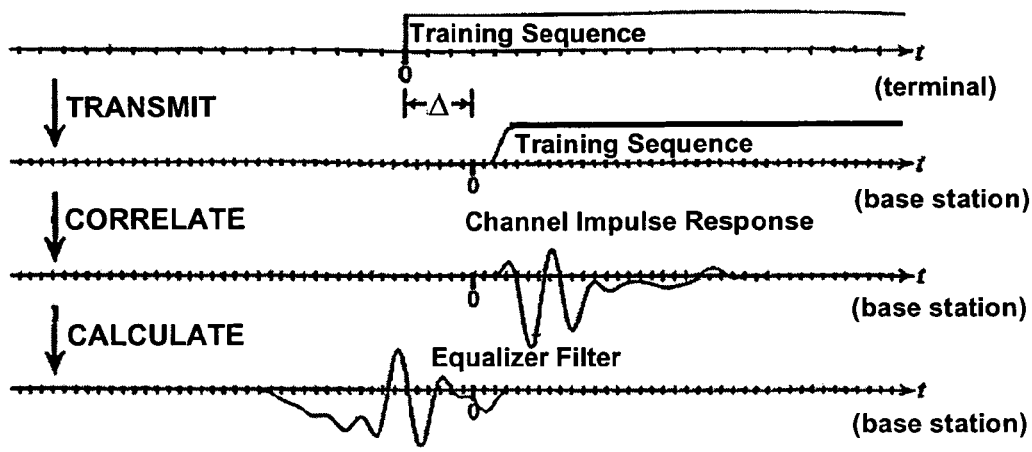
FIGS. 4A, 4B and 4C are graphical illustrations of the function of the equalizers when there is a timing offset present.
Figure 4B:
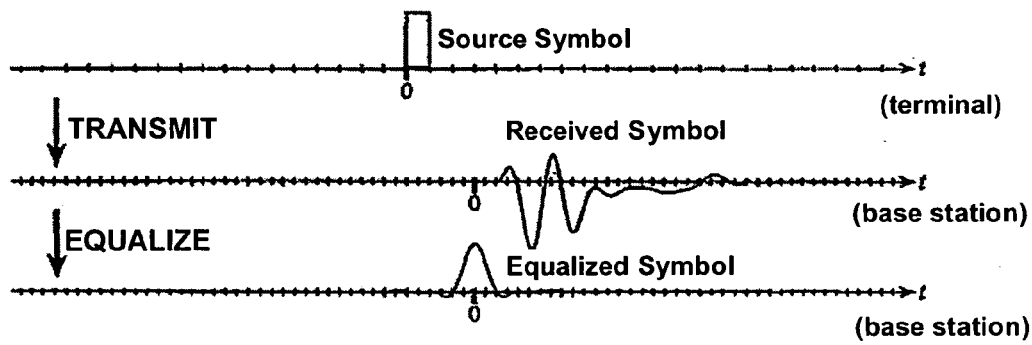
Figure 4C:
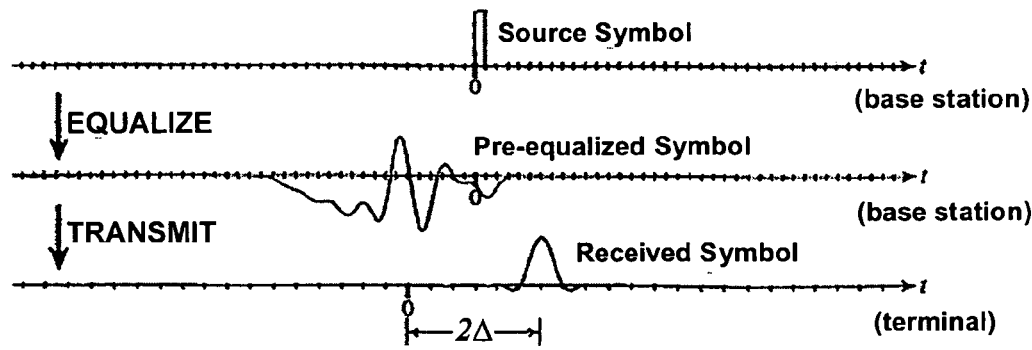

FIGS. 4*a*, 4*b* and 4*c* show the same set of signals as FIGS. 3*a*, 3*b* and 3*c* except that the base station's clock now is now offset in time from the terminal's clock by a time offset, $\Delta$. To identify signals and transfer functions that are influenced by the offset, single prime and double prime notation is used. A single prime indicates that the signal or transfer function has been influenced by the offset in the uplink direction. A double prime indicates that it has been influenced in the downlink direction. The absence of a prime indicates that it is an ideal signal that occurs when there is no offset.

The presence of the timing offset changes the appearance of uplink and downlink channels differently. Any signal sent from the terminal to the base station appears, by the base station's time reference, to arrive $\Delta$ samples earlier than it would if there were no offset. This channel C'(z) is represented as the ideal channel C(z) advanced by $\Delta$ samples $$C'(z)=C(z)z^{\Delta}. \qquad 3$$

A signal sent from the base station back to the terminal appears, by the terminal's time reference, to arrive $\Delta$ samples later than the ideal. This is represented as the ideal channel delayed by $\Delta$ samples $$C''(z)=C(z)z^{-\Delta}. \qquad 4$$

During the training period (FIG. 4*a*), the training signal measures the offset channel C'(z) not the ideal channel C(z), therefore all of the paths appear $\Delta$ samples too short. From these erroneous measurements, the equalization filter is calculated.

The measured channel impulse response with a timing offset C'(z) is identical to the ideal one C(z) except that the all of the delays represented in the impulse response appears $\Delta$ samples too short, or $$C'(z)=C(z)z^{\Delta}. \qquad C1$$

This offset will propagate through the remainder of the training procedure. The matched filter used in the equalizer is given by $$\tilde{C}(z)=C^*(1/z^*) \qquad C2$$

Substituting C1 into C2 reveals the effect of the timing offsets on the matched filter, $$\tilde{C}'(z)=C^*(1/z^*)((1/z^*)^{\Delta})^* = \tilde{C}(z)z^{-\Delta}. \qquad C3$$

In other words, the timing offset adds $\Delta$ samples of delay to the matched filter. The next step in the training algorithm is to calculate the equivalent channel given by $$G'_R(z)=[C'(z)\tilde{C}'(z)]_{\downarrow 2R}. \qquad C4$$

Substituting C3 and C1 into C4 gives $$G'_R(z)=[C(z)z^{\Delta}\tilde{C}(z)z^{-\Delta}]_{\downarrow 2R}=[C(z)\tilde{C}(z)]_{\downarrow 2R}=G_R(z), \qquad C5$$

therefore, the timing offset has no effect on the equivalent channel. The common equalizer function Â'(z) depends only on the equivalent channel function G'(z), therefore it will also be unaffected by the delay, $$\hat{A}'(z)=\hat{A}(z). \qquad C6$$

The equalization filter is then given by $$E'(z)=\hat{A}'(z^{2R})\tilde{C}'(z)=\hat{A}(z^{2R})\tilde{C}(z)z^{-\Delta}=E(z)z^{-\Delta}. \qquad C7$$

The net effect that the timing offset of $\Delta$ samples has on the training procedure is to insert an extra delay of $\Delta$ samples into the pre-equalizer and the post-equalizer. In summary, the equalization filter calculated in the presence of a timing offset E'(z) is related to the ideal equalization filter E(z) by a simple delay:

$$E'(z)=E(z)z^{-\Delta}. \qquad 5$$

How the extra delay affects the synchronization of the signals depends on whether data is being sent in the uplink or downlink. When the signal is sent from the terminal (FIG. 4*b*), it first passes through the offset channel (Equation 3) where it is advanced by $\Delta$ samples. Then it passes through the equalization filter (Equation 5) where it is delayed by $\Delta$ samples. The delay in the equalization filter exactly cancels the advance in the channel. As a result, no matter what the value of $\Delta$, a symbol sent on the zero sample of the terminal's clock will appear at the zero sample of the base station's clock. When the base station transmits its signal back to the terminal (FIG. 4*c*), the effects of the timing offset do not cancel. First, the pre-equalization filter (Equation 5) inserts a delay of $\Delta$ samples into the system, and then the channel (Equation 4) inserts another delay of $\Delta$ samples. The result is that signals from the base station always arrive at the terminal $2\Delta$ samples late.

The above discussion brings out two important points. First, a fixed timing offset has no effect on the synchronization of the signal transmitted from the terminal to the base station. This is a positive result in that communications from terminal to the base station can be reliably sent before accurate synchronization is obtained. However, it also has a negative side effect: there is no way of measuring the time offset at the base station by observing signals from the terminal. The second point is that a time offset produces a delay of double that offset on the signal received at the terminal. This means that accurate synchronization is required to communicate with the terminal. It also means that the only place that the time offset can be measured is at the terminal itself.

In the special case where the magnitude of $\Delta$ is an integer, the method of measuring the time offset is trivial. After receiving the training sequence, the base station transmits a known series of symbols back to the terminal. The terminal decodes the symbols and its microcontroller 10 notes the number of samples between the time that the sequence arrives and when it was expected ($2\Delta$). In the example depicted in FIG. 4, this is six terminal samples (or twelve base station samples). The microcontroller 10 reports back the sample offset to the synchronization controller 92 via the network interface 56 and the synchronization controller calculates $\Delta$ (six in this example).

The method of measuring the timing offset described above works only in the special case where the offset between the clocks is an exact multiple of the base station's sample period. In the general case, the timing offset can be any fraction of the sample period, and this causes problems when trying to measure the offset at the terminal. The finest resolution time measurement that the terminal can achieve is the period of its sample clock, ten nanoseconds, but the accuracy required for synchronization is on the order of one nanosecond. Furthermore, if the signal arrives between samples, it is unlikely that the terminal will be able to recover any useful information at all since data errors increase as the offset pushes the symbols away from the optimum sample points. What is needed is a method of measuring time offsets with a finer resolution than the sample clock of the terminal, without increasing the complexity of the terminal.

A similar problem was faced by the makers of precision tools and instruments in the seventeenth century. Lines scratched in metal plates to mark units of distance or angle could only be placed so close together before they became impossible to read, and this limited the precision of instruments. French mathematician Pierre Vernier came up with a technique, known today as the "vernier scale" that gave much greater resolution without having to decrease the spacing of the scale lines. An adaptation of this technique is applied to the terminal to allow it to measure time offsets with a resolution much finer than the time between its samples.

Figure 5:
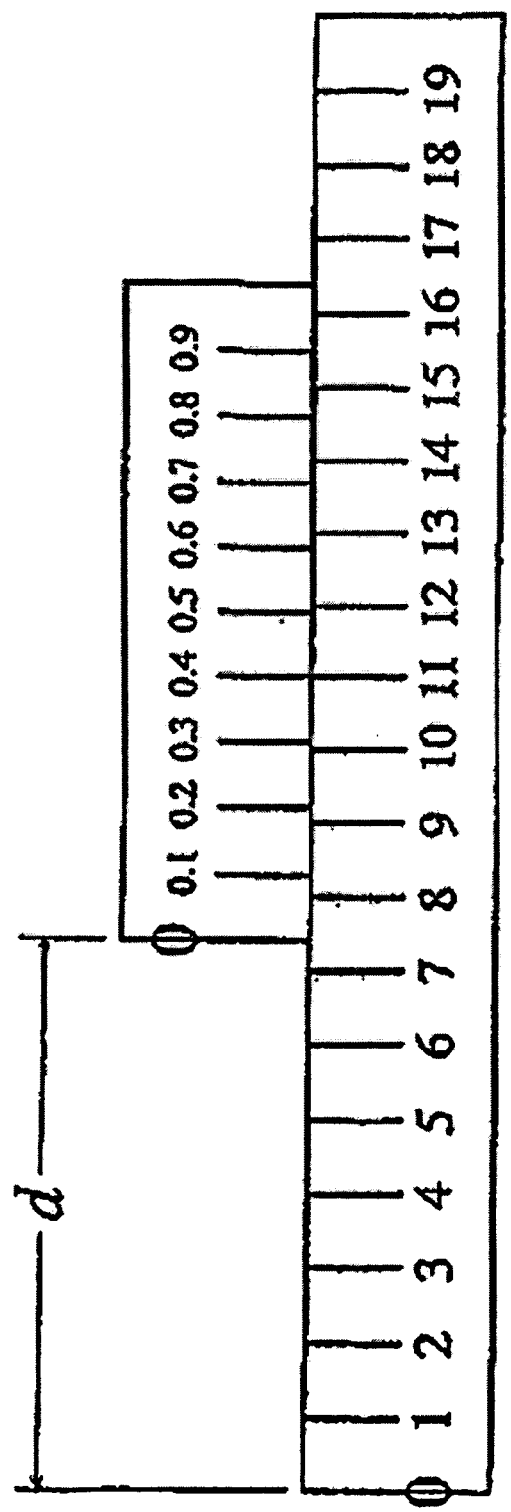
FIG. 5 is a representation of a vernier scale used to measure distance.

The scales shown in FIG. 5 demonstrate the Vernier technique. The scale on the bottom is the main scale marked off in units of distance. The scale on top is the vernier scale. The distance to be measured d is the distance between the zero marks on the upper and lower scales. An approximation to the measurement is obtained by observing where the zero line on the vernier scale intercepts the main scale—in this case somewhere between 7 and 8 units. To get a more precise measurement, the mark on the vernier scale is chosen that best lines up with any mark on the main scale—in this example the mark that corresponds to 0.4 is the best. The distance being measured is therefore 7.4 units. The addition of the vernier scale effectively increased the precision of the main scale by a factor of ten.

The key to Vernier's measurement technique is the spacing of the lines on the vernier scale. Define the spacing between marks on the main scale as one unit. To measure a subdivision of one unit, say 0.1 units for this example, a new mark is added on the vernier scale that is 0.1 units to the left of the zero mark. Now, if d is an integer N units plus 0.1 units, the new mark lines up at N on the lower scale. Similarly, a mark added 0.2 units to the left of zero on the vernier scale would line up with mark N on the main scale when d is N+0.2 units. Marks are added until all the possible divisions between N and N+1 are covered. This gives more accuracy to the scale, but the marks on the vernier scale are too close together to be practical. To spread them out, shift each of the marks on the vernier scale to the right by any integer number of units. In the example shown in FIG. 5, the mark corresponding to the 0.1 offset is shifted one unit to the right (putting it 0.9 units to the right of zero) where it will still line up with some mark on the main scale whenever d is N+0.1 units. Similarly, the mark for 0.2 is shifted right by two units, the mark for 0.3 is shifted right by three units, etc.

Figure 6A:
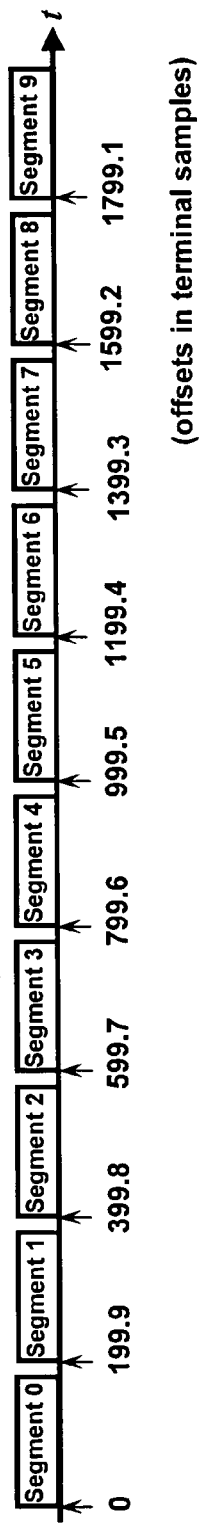
FIGS. 6A and 6B shows the structure of a vernier signal.
Figure 6B:
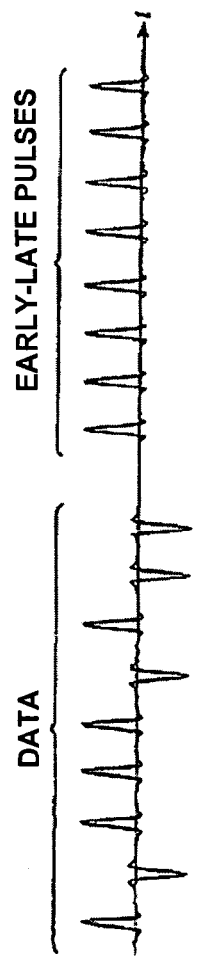

In this system, the vernier scale is used to measure time delay instead of distance. The main scale is the sample clock in the terminal, and the vernier scale is a special synchronization signal sent from the base station. The details of the vernier signal are shown in FIGS. 6a and 6b. This signal is designed to measure the time delay to an accuracy of one tenth of the terminal's sample period. To measure a delay that is 0.1 samples past an integer delay value, the base station advances the signal by 0.1 samples, so that it will line up with one of the terminal's sample points, and then delays it by an integer number of samples. More signals are used to measure delays of 0.2 samples, 0.3 samples, etc. To cover all possible time delays requires ten such segments as shown in FIG. 6a. The integer shifts in this case are multiples of 200 samples. To read the vernier signal, the terminal's microcontroller 10 picks which of the ten segments best lines up with its sample clock and records when the start of that segment occurs. While a fraction of $\frac{1}{10}$ has been used in this example, other fractions of the sample period may be used depending on the desired accuracy and sensitivity of the terminal.

To assist the terminal in picking the best segment, each segment is composed of two components as shown in FIG. 6b. The first component is a series of known bits transmitted at the lowest data rate (maximum frequency diversity). If the signal arrives close to the terminal's sample time, the terminal's decoder 40 will be able to decode this sequence and determine the start sample of the segment. The second component is a set of early-late pulses, used to measure the offset of the samples in this segment from the optimum sample point. From these, the terminal determines which of the ten segments is best synchronized to its sample clock. The details of early-late synchronization are described later.

In the return signal to the base station, the terminal's microcontoller 10 reports the start sample of the best of the ten segments. The network interface 56 passes the information to the synchronization controller 92 to determine the offset. The starting times of the ten sections are 0, 199.9, 399.8, 599.7, 799.6, 999.5, 1199.4, 1399.3, 1599.2, and 1799.1 terminal samples respectively. Say that the terminal reports that the best segment started at sample 604. The synchronization controller compares the start sample measured at the terminal to the starting time of the nearest section—599.7 samples in this case—and the difference is the delay in the signal received at the terminal—4.3 terminal samples or 43 ns. The delay measured at the terminal is double the offset between the base station clock and the terminal clock, therefore the offset $\Delta$ is 21.5 ns or 4.3 base station samples.

The process of synchronization is further complicated if a frequency offset exists between the terminal's sample clock and the base station's sample clock. With conventional temperature compensated crystal oscillators, the frequency of the terminal's free running oscillator can be pre-adjusted to be very close to the base station's free running oscillator—within a few parts per million. However, even these tiny frequency offsets affect the timing of the signals. Two cases in particular require that the frequency offset be measured accurately. As described in Asymmetric Equalization System for Data Transmission, Canadian patent application no. 2,234,777 published Oct. 15, 1999, corresponding to U.S. patent application Ser. No. 09/060,759 filed Apr. 15, 1998, the content of which is hereby incorporated by reference, the training sequence is transmitted well in advance of the data packet in order to give the base station time to compute the equalization filter coefficients. A small difference in frequency between the base station and terminal clocks can cause the time offset to change sufficiently between the training sequence and the data transfer to increase the bit error rate. The base station must be able to predict and correct this change. In addition, it is desirable to be able to predict what the timing offset will be some time in the future. Being a time-shared wireless network, there will be large gaps in the transmission of packets to a terminal while the base station is serving other terminals in the network. If the base station can predict how much the timing offset changes across the gap, then it does not have to re-synchronize to the terminal at the start of each new burst of data.

To analyze the effect of the frequency offset, the constant time offset $\Delta$, used previously, is replaced by a time varying offset $\delta(t)$. If the frequency offset is constant then $\delta(t)$ is described by $$\delta(t) = \delta_0 - \frac{f_0 t}{10^6}, \quad\quad 6$$

where $\delta_0$ is the offset at time zero and $f_0$ is the frequency offset measured in parts per million. A positive $f_0$ indicates that the base station's clock is faster than the terminal's clock. Both t and $\delta(t)$ are measured in units of base station samples. The three steps of the network packet—training, downlink, and uplink—take place at times $t_t$, $t_d$, and $t_u$ respectively. It is assumed that the frequency offset is small enough that the change in time offset within a training sequence, downlink, or uplink segment is insignificant.

The vernier signals described in the previous section must now be used to measure two parameters: $\delta_0$ and $f_0$. It was determined that the delay in the received signals at the terminal is composed of the sum of two components: the timing offset during training and the timing offset during the vernier packet transmission (the downlink). When the offset is a constant, dividing the measured delay by two returnes the timing offset, $\Delta$. Under the influence of a frequency offset, dividing by two returns the average offset of the training and downlink sections, $[\delta(t_t)+\delta(t_d)]/2$. From Equation 6, the equality $$\frac{\delta(t_t) + \delta(t_d)}{2} = \delta\left(\frac{t_t + t_d}{2}\right) \quad\quad 7$$

is derived, which means that this measurement is accurate at a time midway between the training sequence and the transmission of the downlink segment. This provides two pieces of information: the value of the offset and the time that it occurred. To complete the initial synchronization process, two vernier signals spaced well apart in time are transmitted and measured to give the two sets of time-offset values. The results are used to solve Equation 6 for $\delta_0$ and $f_0$.

Knowing the parameters of the offset equation allows the base station to predict and correct time offsets in both the uplink and the downlink signals. It was demonstrated that the constant time offsets has no effect on the signal from the terminal. Time varying offsets however may produce a small but significant error. When the signal is transmitted, the error in the channel causes the signal to be advanced by $\delta(t_u$ samples. The error in the equalization filters causes it to be delayed by $\delta(t_t$ samples. The net delay for the uplink is $$\Delta_u = \delta(t_t) - \delta(t_u) = (t_u - t_t) f_0 / 10^6 \quad\quad 8$$

samples. Under normal circumstances, this value is small (less than one sample) however it may be enough to cause sub-optimal performance and should be corrected by advancing the signal by this value within the post-equalization filter 84. The delay added to data signals transmitted to the terminal is equal to the sum of the offset at the time of training and the offset at the time of the downlink:

$$\Delta_d = \delta(t_t) + \delta(t_d). \quad\quad 9$$

This is corrected by adding a corresponding advance within the pre-equalization filter 62.

The accuracy of the initial offset $\delta_0$ is limited by the accuracy of the vernier measurement, about one nanosecond. The accuracy of the frequency offset $f_0$ depends on both the accuracy of the vernier measurement and the time between measurements. For example, with a vernier accuracy of one nanosecond (or 0.2 base station samples) and a separation of one second ($2 \times 10^8$ base stations samples) between vernier packets, the accuracy of the frequency offset measurement is on the order of 0.001 parts per million. This level of accuracy is necessary if the base station leaves one terminal for some time to service other terminals, and expects to return to the original terminal still synchronized.

Within short time periods, it is safe to assume that the frequency offset is a constant and the time offset changes as shown in Equation 6, however in longer time periods the frequency of the oscillators will vary. Some of the processes that cause this variation are aging, temperature changes, supply voltage changes, and a slow random variation in the frequency/phase of the oscillator known as phase noise. Once the time and frequency offsets are established using the processes described above, the synchronization must be tracked to account for the slow variations in $\delta_0$ and $f_0$, and to compensate for any errors made in the initial calculation of the parameters. An asymmetric adaptation of the standard early-late synchronization circuit is used for this process.

Figure 7:
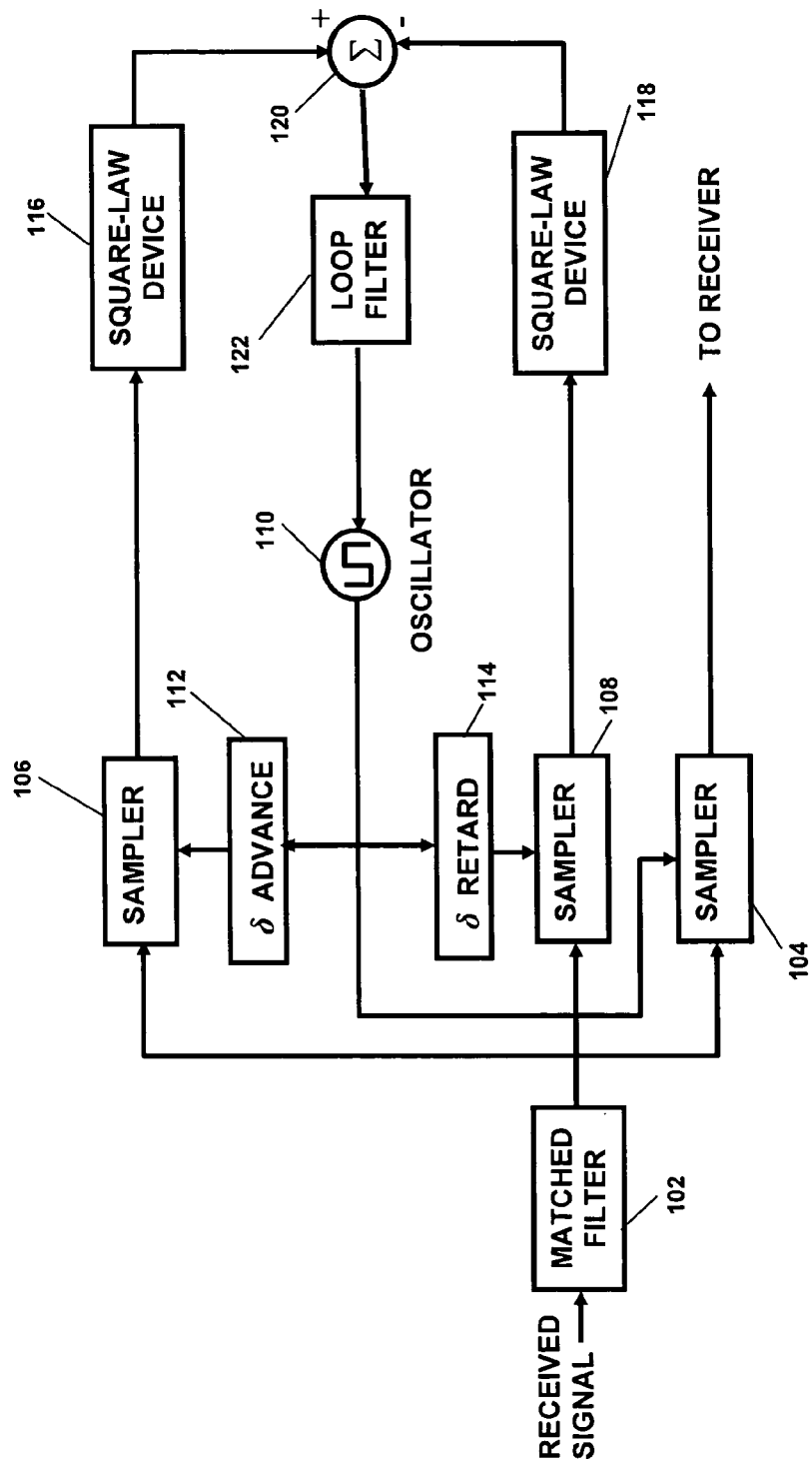
FIG. 7 is a representation of a conventional early-late synchronization circuit.

FIG. 7 shows one implementation of an early-late synchronization circuit as described in Proakis, J. G., *Digital Communications*, Third Edition, McGraw-Hill, New York, N.Y., 1995, pp. 362–365, although other circuits may be used. The device operates based on the property that the output of a matched filter is symmetric and has its maximum amplitude at the optimum sample point. The received signal is match filtered by a matched filter 102 and split into three paths. One path goes to the receiver through sampler 104 and the other two to the synchronizer through samplers 106 and 108, whose sampling rate, controlled by oscillator 110, is respectively advanced or delayed at 112, 114. One of the synchronizer paths is sampled in sampler 106 a small time, δ, earlier than the signal that goes to the receiver; the other is sampled in sampler 108 δ seconds later. Because of the symmetry property, the early sample will be exactly the same magnitude as the late sample if the sampling is occurring at the optimum point. If the signal is late, then the peak of the signal is pushed towards the late sample and it will appear larger than the early sample. The signals from the samplers 106, 108, are passed through square law devices 116, 118 respectively and thence to difference circuit 120. The difference circuit 120 and loop filter 122 detects whether the signal is late or early, and slows the oscillator or increases the oscillator frequency to compensate.

Figure 8A:
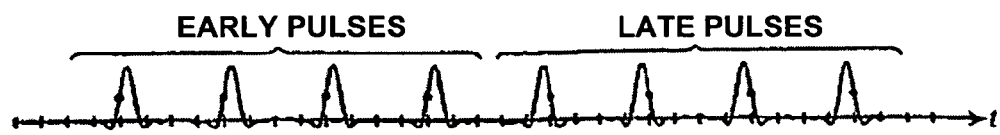
FIGS. 8A, 8B and 8C show the structure of the early-late pulses.
Figure 8B:
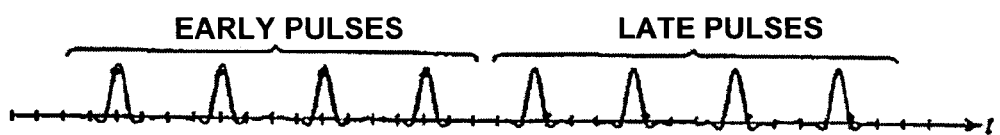
Figure 8C:
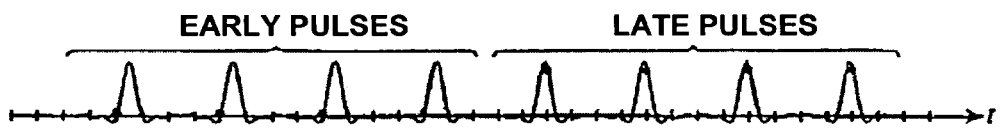

The same early-late concept is applied to this system using an asymmetric design. To generate the symmetric pulse required by the early-late synchronizer, the synchronization controller 92 transmits the impulse response of the matched filter $\tilde{C}'(z)$. This signal forms a symmetric pulse (equal to the autocorrelation function of the channel) at the terminal. The transmissions are advanced by $\Delta_d$ samples to compensate for the expected time offset between sample clocks, and then delayed by an additional base station sample which moves the optimum sample point to a time midway between samples from the terminal's slower clock. A series of these pulses, as seen at the terminal's receiver, are shown in FIG. 8A. More than one pulse is transmitted so that the terminal can reduce the effect of channel noise by averaging the signal. In this example, there are eight pulses in the series; the first four are sampled on the early side of the pulse, and the last four are sampled on the late side. Each of the two sets is summed in the terminal's accumulator 38, and the results are measured by the terminal's power detector 42. When the synchronization is correct, the power level in the early samples will match the power level in the late samples as shown in FIG. 8A. If the signal arrives too early (FIG. 8B), the power in the early samples will be greater than the power in the late samples. A late arriving signal causes the late samples to be greater in power (FIG. 8C).

This measurement technique is used in the vernier signals described above. In that instance, the vernier segment whose early and late power measurement most closely match is determined to be the best segment. The same technique is used to track the synchronization errors after the initial vernier measurements are complete. A series of early-late pulses are transmitted in the precursor of each TDMA packet. The terminal measures the pulses as described above and determines whether the signal is early, late, or about right. This information is relayed back to the base station where small adjustments are made to $\delta_0$ to correct the drift. By observing the accumulation of adjustments over several seconds, the base station determines if its estimate of $f_0$ is high or low and makes the necessary corrections.

Early-late synchronizers only work if there is a consistent stream of information to the receiver. If the offset drifts by too much between tests, synchronization will be lost. In this time-shared system, there will be gaps between packets to any one terminal where early-late measurements are impossible. With good quality oscillators and an accurate estimate of $f_0$, it may be possible to bridge gaps of as much as a second without losing synchronization. Beyond that, the changes in offset between packets are beyond the prediction capability of the simple model given in Equation 6. In the case of very large gaps, it may be necessary to correct the time offset estimate with a single vernier packet before continuing with early-late synchronization The base station must be able to make minute timing adjustments to correct for the effects of the timing offset and to generate vernier signals and early-late timing signals. The base station's sample clock, which runs at twice the rate of the symbol clock, allows timing adjustments with a resolution of 5 ns with simple delay elements. The synchronization circuits require a minimum resolution of 1 ns. To achieve this, the effective sample rate within the base station must be increased to at least 1 GHz.

Figure 9A:
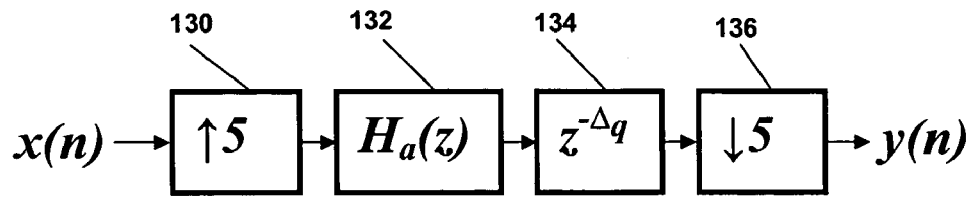
FIGS. 9A, 9B and 9C show suitable timing adjustment filters.

Timing adjustments are achieved with the interpolator-delay-decimator chain shown in FIG. 9A. The signal's sample frequency is increased to 1 GHz by an interpolator composed of the expander 130 (↑5) and the anti-aliasing filter $H_a(z)$ 132. Anti-aliasing filters are well known in the art, as for example described in P. P. Vaidyanathan, *Multirate Systems and Filter Banks*, Prentice Hall, Englewood Cliffs, N.J., 1993, pp. 105–109. The signal can now be delayed or advanced at 134 by a quantized value $\Delta_q$, to an accuracy of one cycle of the 1 GHz clock (1 ns). The decimator 136 (↑5) completes the circuit by reducing the sample rate back down to the base station's normal 200 MHz.

Figure 9B:
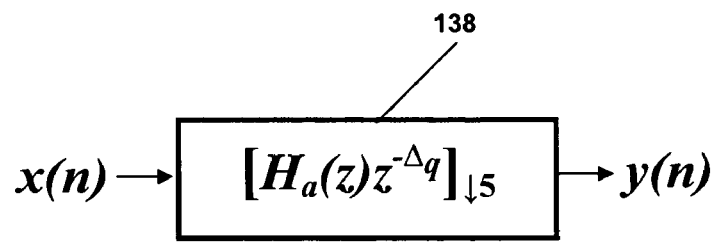
Figure 9C:
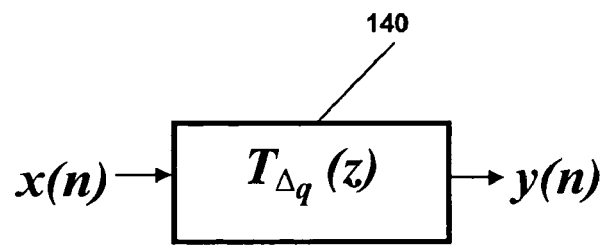

While the structure shown in FIG. 9A is effective, it is not very efficient. A more efficient structure is found by applying the polyphase identity (Vaidyanathan, *Multirate Systems and Filter Banks*, Prentice Hall, Englewood Cliffs, N.J., 1993, p. 133) to achieve the system in FIG. 9B, which uses filter 138. Although this still allows time adjustments of 1 ns, the filter runs at 200 MHz rather than the faster 1 GHz. This timing adjustment filter is then reduced to the simple filter 140 shown in FIG. 9C, which is given by $$T(z)=[H_a(z)z^{-\Delta q}]_{\downarrow 5}. \qquad 10$$

The synchronization controller 92 computes the pre-equalizer delay $\Delta_d$ (from Equation 9) and a post-equalizer delay $\Delta_u$ (from Equation 8) and passes them to the equalization controller 94. This uses Equation 10 to compute the time adjustment filters $T_d(z)$ and $T_u(z)$ respectively. From there it computes the parameters for the pre-equalization filter 62 from Equation 2, and the post-equalization filter 84 from Equation 1.

While it is theoretically possible to allow the clocks in the base station and terminals to drift apart without bound, as a practical matter it is best to keep the timing offsets relatively small. The main problem is with the time-multiplexed frame that allows all terminals to share the same radio frequency band. Over time the frame counters 54 and 14 will drift apart and conflicts between terminals will occur. The synchronization controller 92 handles this by monitoring the magnitude of δ(t) for each of its terminals. If an offset becomes too large, the is sends a message to the offending terminal's microcontroller 10. The microcontroller updates its frame counter 14 to adjust its frame reference by a given number of samples. The base station simultaneously adjusts $\delta_0$ for that terminal to reflect the change. These coarse adjustments make sure that δ(t) is never too large and the TDMA frame integrity is maintained.

Figure 10:
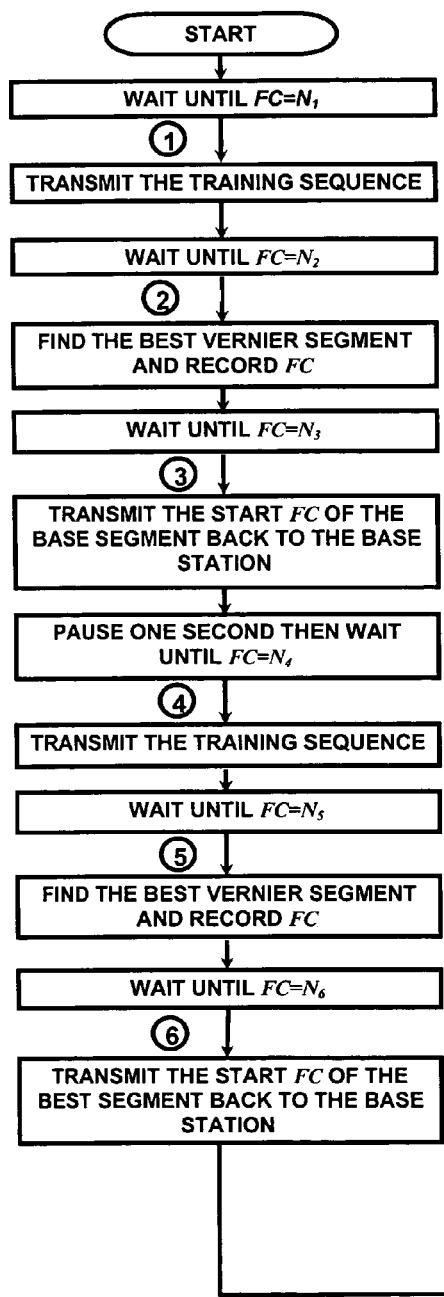
FIG. 10 is a flow diagram showing the operation of the terminal's microcontroller 10 during the establishment and maintenance of synchronization.
Figure 10:
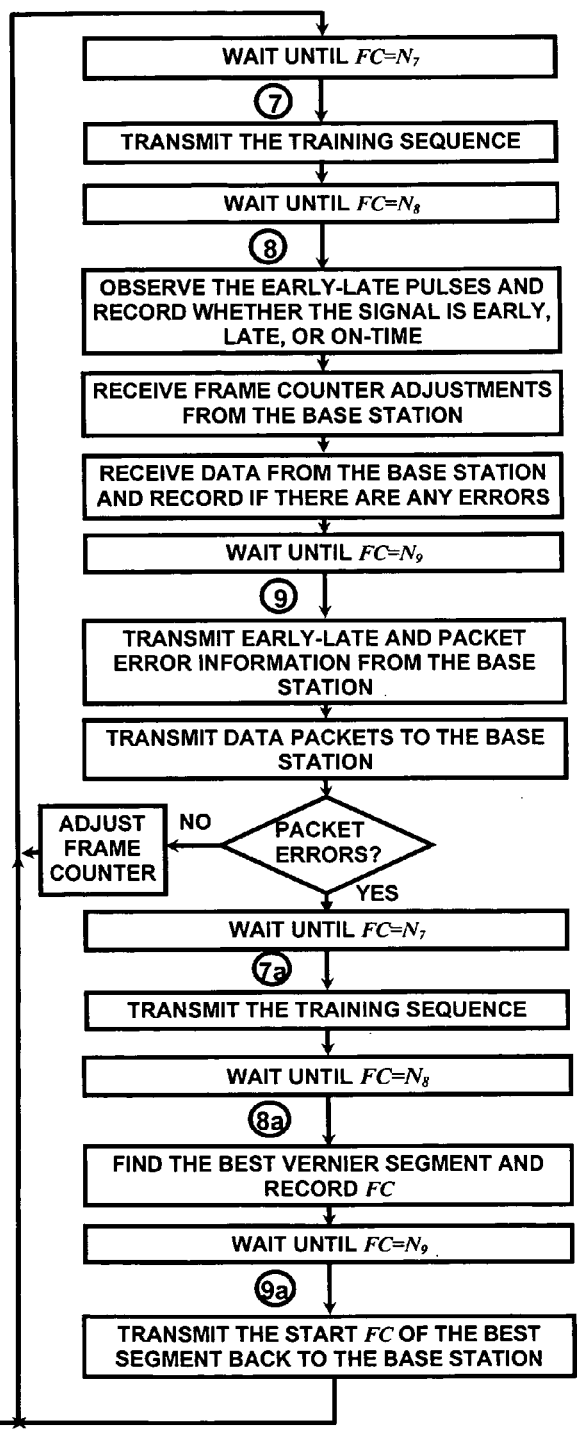
Figure 11:
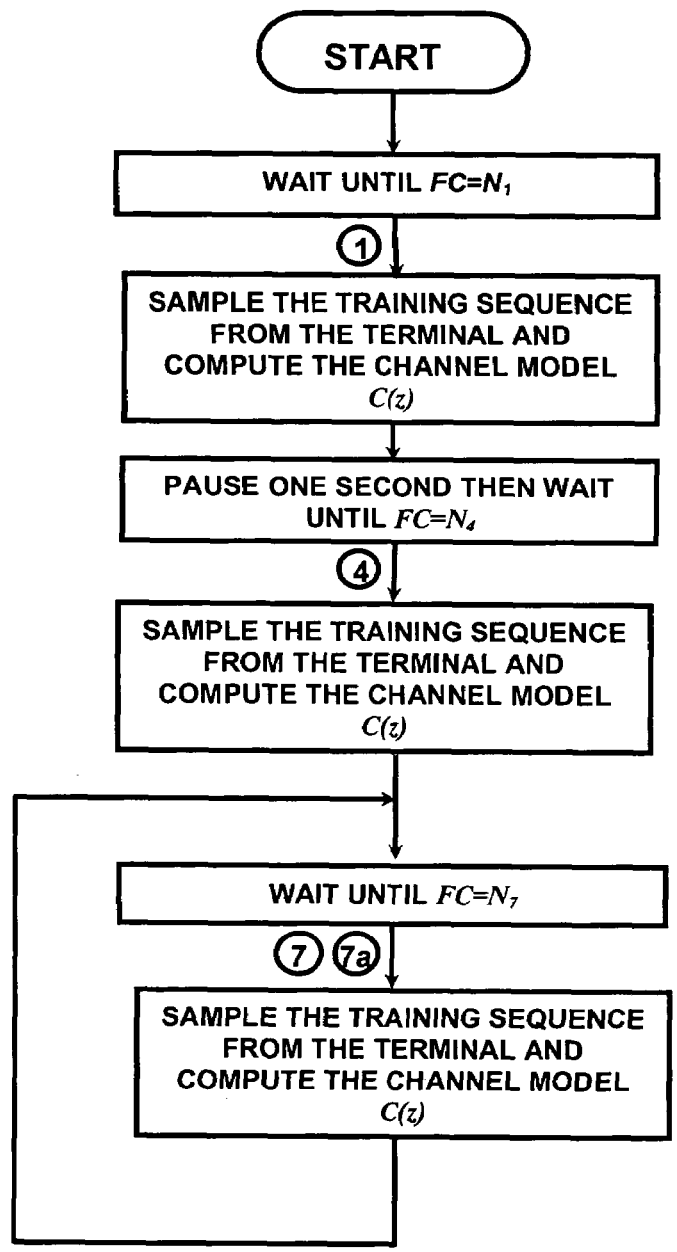
FIG. 11 is a flow diagram detailing the operation of the base station's channel detector 90.
Figure 12:
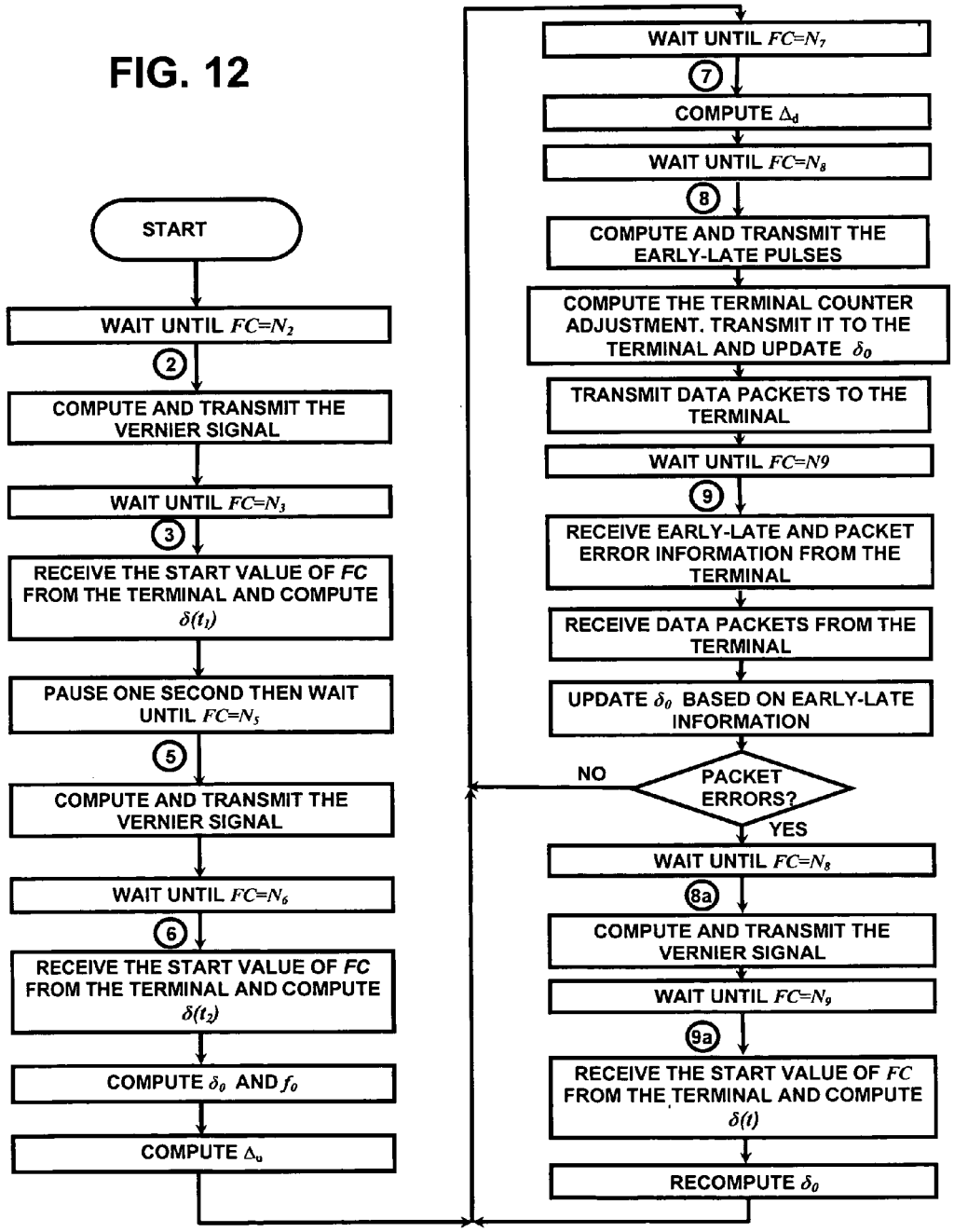
FIG. 12 is a flow diagram detailing the operation of the base station's synchronization controller 92.
Figure 13:
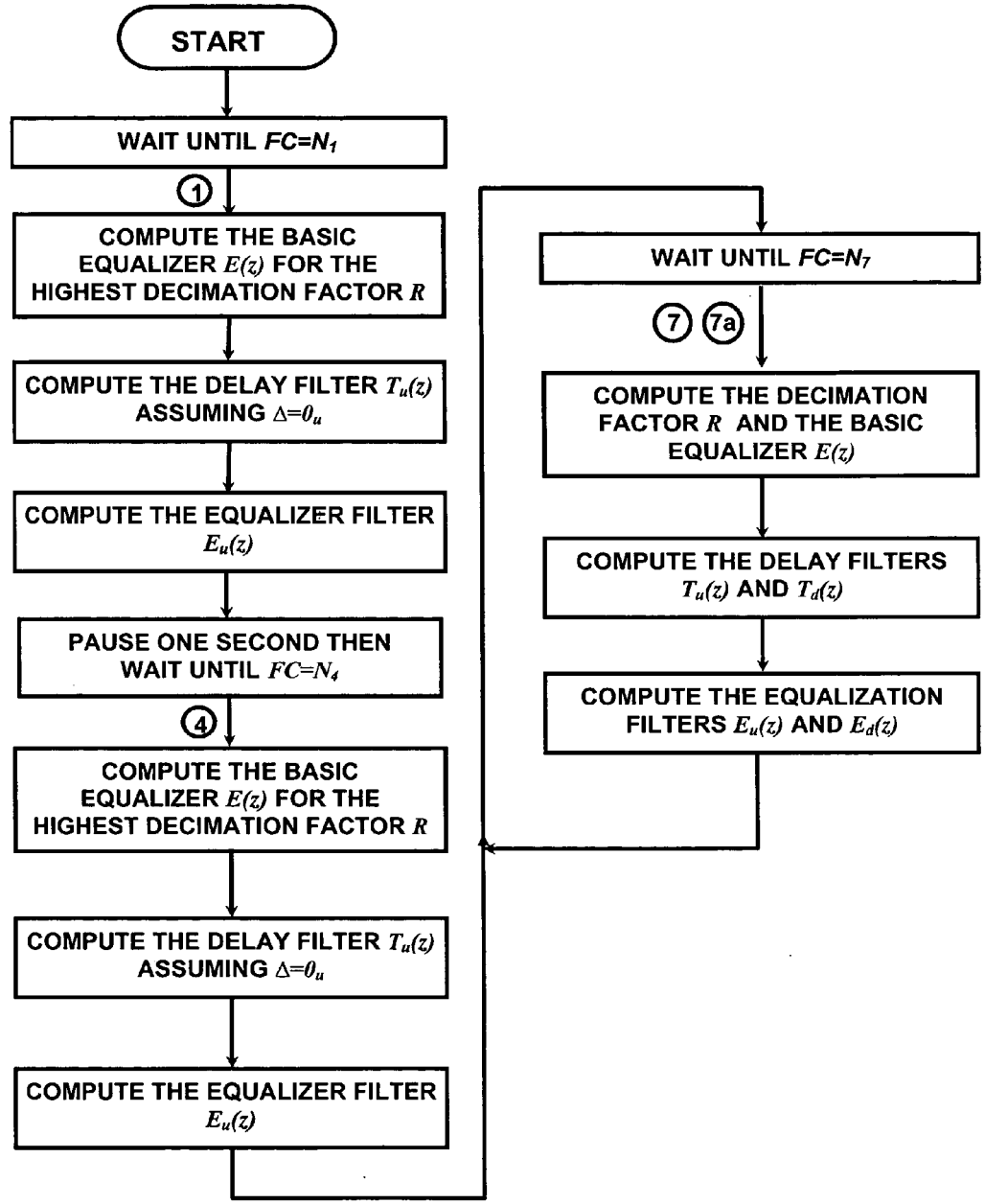
FIG. 13 is a flow diagram detailing the operation of the base station's equalization controller 94.

FIG. 10 details the operation of the terminal's microcontroller 10 during the establishment and maintenance of synchronization. FIGS. 11, 12, and 13 detail the operation of the base station's channel detector 90, synchronization controller 92, and equalization controller 94 respectively. The circled numbers on the flowcharts indicate events that happen in the different devices concurrently. Each number corresponds to one of the steps in the summary below. The events are triggered at specific counts of the frame counters 14 and 54. $N_1$ is the count that triggers the first step, $N_2$ is the count that triggers the second and so on. The variable FC represents the current value of the frame counter. At the start of synchronization, the N values are set to defaults that are identical in the base station and terminal, and the frame counters are aligned very roughly by some other synchronization means. For example, the base station can define certain times within the frame that it is always transmitting and other times when nothing is transmitting. The terminal can detect these regions using its power detector 42 to roughly align its frame clock to the base station before beginning the synchronization procedure below. After synchronization is achieved, the network interface 56 may update the N values as necessary to adjust for network conditions and inform the terminal microcontroller 10 of the updates through the open communication link.

The following procedure summarizes the steps involved in establishing and maintaining synchronization between the base station and a given terminal.

Establishing the Connection:

Step 1: The terminal's microcontroller 10 transmits the symbols that make up the training sequence. The base station's channel detector 90 samples the signal and computes a channel model C(z) as described in paragraphs 25–30 herein. The equalization controller computes and basic equalization filter E(z) and then generates post-equalization filter coefficients according to Equation 1 (assuming that $T_u(z)$ has no delay).

Step 2: The synchronization controller 92 computes and transmits a vernier signal. The terminal's microcontroller 10 uses its data decoder 40 to search for the known sequence of bits at the start of each segment. When it finds the bits, it uses its accumulator 38 and power detector 42 on the early-late pulses to determine how accurate the timing is.

Step 3: The microcontroller 10 transmits the value of the frame counter 14 that marked the start of the best vernier segment. The frame counter information from the terminal is then decoded and sent to the synchronization controller to establish the first value of $\delta(t)$.

Step 4: The system pauses for one second to allow the clocks to drift. The terminal's microcontroller 10 transmits the symbols that make up the training sequence. The base station's channel detector 90 samples the signal and computes a channel model C(z) as described in paragraphs 25–30 herein. The equalization controller computes and basic equalization filter E(z) and then generates post-equalization filter coefficients according to Equation 1 (assuming that $T_u(z)$ has no delay).

Step 5: The synchronization controller 92 computes and transmits a vernier signal. The terminal's microcontroller 10 uses its data decoder 40 to search for the known sequence of bits at the start of each segment. When it finds the bits, it uses its accumulator 38 and power detector 42 on the early-late pulses to determine how accurate the timing is.

Step 6: The microcontroller 10 transmits the value of the frame counter 14 that marked the start of the best vernier segment. The frame counter information from the terminal is then decoded and sent to the synchronization controller to establish the second value of $\delta(t)$. This combined with the measurement from Step 3 are used to compute $\delta_0$ and $f_0$ from Equation 6. The synchronization controller computes the value of $\Delta_u$ from Equation 8.

Maintaining the Connection:

Step 7: The terminal's microcontroller 10 transmits the symbols that make up the training sequence. The base station's channel detector 90 samples the signal and computes a channel model C(z) as described in paragraphs 25–30 herein. The synchronization controller 92 uses Equations 6 and 9 to compute the value of $\Delta_d$. The equalization controller 94 computes the basic equalization filter E(z) from C(z), the delay filters $T_u(z)$ and $T_d(z)$ from $\Delta_u$ and $\Delta_d$ respectively, and the pre- and post-equalization filter coefficients $E_u(z)$ and $E_d(z)$ from Equations 1 and 2.

Step 8: The synchronization controller 92 transmits a series of early-late pulses and then switches the mulitplexer 64 so that the network interface 56 can transmit pre-equalized network data to the terminal. If the terminal's frame counter needs to be updated, then the synchronization controller 92 sends the terminal's microcontroller 10 a message through this data link. The terminal uses its accumulator 38 and power detector 42 to establish whether the signal is arriving early, late, or on-time. Following the early-late pulses, the terminal uses its decoder 40 to recover network data and any messages sent from the synchronization controller. If errors are detected in the recovered data, then an error flag is set.

Step 9: The microcontroller 10 transmits its early-late and packet error messages to the base station. The network interface 56 passes these messages on to the synchronization controller 92 and passes the network data onto the outside network. If the terminal reports that the signal was on time then the systems proceeds directly to Step 7 for the next packet. The base station adjusts $\delta_0$ slightly higher or lower if the terminal reported that the packets were slightly early or late. If errors were detected in Step 8, both the terminal and the base station assume synchronization has been lost and proceed to Step 7a to recover, otherwise they return to Step 7 to exchange the next data packet. Any frame counter update that the terminal is required to make is done at this point.

Recovering from an Error:

Step 7a: The terminal's microcontroller 10 transmits the symbols that make up the training sequence. The base station's channel detector 90 samples the signal and computes a channel model C(z) as described in paragraphs 25–30 herein. The synchronization controller 92 uses Equations 6 and 9 to compute the value of $\Delta_d$. The equalization controller 94 computes the basic equalization filter E(z) from C(z), the delay filters $T_u(z)$ and $T_d(z)$ from $\Delta_u$ and $\Delta_d$ respectively, and the pre- and post-equalization filter coefficients $E_u(z)$ and $E_d(z)$ from Equations 1 and 2.

Step 8a: The synchronization controller 92 computes and transmits a vernier signal. The terminal's microcontroller 10 uses its data decoder 40 to search for the known sequence of bits at the start of each segment. When it finds the bits, it uses its accumulator 38 and power detector 42 on the early-late pulses to determine how accurate the timing is.

Step 9a: The microcontroller 10 transmits the value of the frame counter 14 that marked the start of the best vernier segment. The frame counter information from the terminal is then decoded and sent to the synchronization controller. The synchronization controller recomputes $\delta_0$ based on the information to reestablish synchronization and then proceeds to Step 7 to attempt to exchange data again.

While the vernier signal has been described as being formed of successive time segments advanced by successive multiples (1, 2, 3 . . . etc) of a fraction (1/10) of the remote sample period, the segments need not be in that order, and may be any of various fractions, so long as the remote terminal is able to identify the time segments and their offset. The vernier signal should cover the entire sample period, since gaps will reduce the accuracy of the synchronization.

In a case where pre-equalization is not required to correct for channel effects, but only to correct for timing errors, the pre-equalizer may only advance the transmitted signal and may not incorporate any channel correction.

While a preferred implementation has been described, a skilled person in the art will appreciate that immaterial modifications may be made to the invention described here without departing from the essence of the invention.

I claim:

1. A method of synchronizing a base station with a remote terminal, in which the base station has a base oscillator, the base oscillator having a base sample period, and in which the remote terminal has a remote oscillator, the remote oscillator having a remote sample period, the method comprising the steps of:

transmitting a training sequence from the remote terminal to the base station over a channel;

upon receipt of the training sequence at the base station, transmitting a first vernier signal from the base station to the remote terminal over the channel, in which the first vernier signal comprises successive time segments, each time segment being offset in time from a multiple of the remote sample period by different multiples of a fraction of the remote sample period;

identifying a time segment in the successive time segments that upon receipt by the remote terminal most closely matches the remote oscillator;

determining a first time offset between the base oscillator and the remote oscillator from the identified time segment; and advancing signals transmitted from the base station to the remote terminal by the first time offset.

2. The method of claim 1 further comprising the step of adjusting signals transmitted from the base station to reduce effects of the channel before transmitting the first vernier signal to the remote terminal.

3. The method of claim 1 further comprising the steps of:

transmitting a second vernier signal from the base station to the remote terminal over the channel after transmitting the first vernier signal;

determining a second time offset from the second vernier signal;

determining a frequency offset between the base oscillator and the remote oscillator from the first time offset and the second time offset; and periodically adjusting the advancing of signals transmitted from the base station to the remote terminal to account for changes in time offset between the base oscillator and the remote oscillator.

4. The method of claim 1 in which identifying a time segment in the successive time segments that most closely matches the remote oscillator is carried out by using early-late synchronization.

5. The method of claim 1 further comprising the step of adjusting the time offset for variation in time offset between the base oscillator and the remote oscillator by:

transmitting a series of early-late pulses from the base station to the remote terminal;

identifying whether the early-late pulses are early or late; and adjusting the time offset of signals transmitted from the base station to the remote terminal according to whether the early-late pulses are early or late.

6. The method of claim 1 in which each succeeding time segment of the successive time segments is offset by successive multiples of a fraction of the remote sample period.

7. The method of claim 1 in which each succeeding time segment of the successive time segments is advanced by successive multiples of a fraction of the remote sample period.

8. The method of claim 1 in which the fraction has the form 1/N where N is an integer.

9. The method of claim 1 in which the time segments uniformly cover the sample period.

10. A base station for synchronizing a telecommunications network, the telecommunications network incorporating a remote terminal having a remote oscillator, the remote oscillator having a remote sample period, the apparatus comprising:

a transmitter comprising a digital to analog converter and a pre-equalizer filter;

a receiver comprising an analog to digital converter and a post-equalizer filter;

a base oscillator, the base oscillator having a base sample period, the base oscillator being connected to supply a clock signal to the digital to analog converter and to the analog to digital converter;

a frame counter connected to receive a clock signal from the base oscillator;

an equalization controller connected to the pre-equalizer filter to provide radio channel corrections and a timing advance to signals transmitted from the base station and connected to the post-equalizer filter to provide radio channel corrections and a timing advance to signals received from the terminal;

a synchronization controller connected to receive frame position information from the frame counter, the synchronization controller being connected to receive signals from the receiver and being configured to determine a timing advance required to adjust the base oscillator to be synchronized to the remote oscillator, the synchronization controller being connected to supply the timing advance to the equalization controller; and the synchronization controller being configured to generate a vernier signal, in which the vernier signal comprises successive time segments, each time segment being offset in time from a multiple of the remote sample period by different multiples of a fraction of the remote sample period.

11. The base station of claim 10 in which the receiver is connected to the equalization controller and the synchronization controller through a channel detector, and the channel detector is configured to determine coefficients for the post-equalizer filter and the pre-equalizer filter that model the effect of the radio channel.

12. The base station of claim 10 in which the receiver comprises a post-equalizer filter connected to the equalization controller to receive channel equalization coefficients and channel offset correction coefficients from the equalization controller.

13. The base station of claim 10 in which the equalization controller is configured to monitor time variation of timing offset between the base oscillator and the remote oscillator and to correct timing advance according to the time variation of the timing offset.

14. The base station of claim 11 in which, in the vernier signal, each succeeding time segment of the successive time segments is advanced by successive multiples of a fraction of the remote sample period.

15. The base station of claim 10 in which the time segments uniformly cover the sample period.

16. A base station for synchronizing a telecommunications network, the telecommunications network incorporating a remote terminal having a remote oscillator, the remote oscillator having a remote sample period, the apparatus comprising:
- a transmitter comprising a digital to analog converter and a pre-equalizer filter;
- a receiver comprising an analog to digital converte;
- a base oscillator, the base oscillator having a base sample period, the base oscillator being connected to supply a clock signal to the digital to analog converter and to the analog to digital converter;
- a frame counter connected to receive a clock signal from the base oscillator;
- an equalization controller connected to the pre-equalizer filter to provide a timing advance to signals transmitted from the base station;
- a synchronization controller connected to receive frame position information from the frame counter, the synchronization controller being connected to receive signals from the receiver and being configured to determine a timing advance required to adjust the base oscillator to be synchronized to the remote oscillator, the synchronization controller being connected to supply the timing advance to the equalization controller; and
- the synchronization controller being configured to generate a vernier signal, in which the vernier signal comprises successive time segments, each time segment being offset in time from a multiple of the remote sample period by different multiples of a fraction of the remote sample, the time segments uniformly covering the sample period.

17. The base station of claim 16 in which, in the vernier signal, each succeeding time segment of the successive time segments is advanced by successive multiples of a fraction of the remote sample period.

* * * * *